(12) United States Patent
Gomes et al.

(10) Patent No.: US 11,308,485 B2
(45) Date of Patent: Apr. 19, 2022

(54) PROCESSING A TRANSACTION USING ELECTRONIC TOKENS

(71) Applicant: PAYPAL, INC., San Jose, CA (US)

(72) Inventors: Dinesh Agnello Gomes, San Jose, CA (US); Nitin Prabhu, San Jose, CA (US)

(73) Assignee: PAYPAL, INC., San Jose, CA (US)

(*) Notice: Subject to any disclaimer, the term of this patent is extended or adjusted under 35 U.S.C. 154(b) by 1395 days.

(21) Appl. No.: 15/211,657

(22) Filed: Jul. 15, 2016

(65) Prior Publication Data
US 2018/0018660 A1 Jan. 18, 2018

(51) Int. Cl.
*G06Q 20/38* (2012.01)
*H04L 29/06* (2006.01)
*G06Q 20/36* (2012.01)
*H04W 12/06* (2021.01)

(52) U.S. Cl.
CPC ..... *G06Q 20/3821* (2013.01); *G06Q 20/3678* (2013.01); *H04L 63/08* (2013.01); *H04L 63/102* (2013.01); *H04W 12/06* (2013.01); *H04W 12/068* (2021.01)

(58) Field of Classification Search
CPC .................. G06Q 20/38; G06Q 20/382–3829
See application file for complete search history.

(56) References Cited

U.S. PATENT DOCUMENTS

| | | | | |
|---|---|---|---|---|
| 9,195,984 B1* | 11/2015 | Spector | ................ | G06Q 20/322 |
| 9,524,501 B2* | 12/2016 | Weber | .................. | G06Q 20/382 |
| 9,704,155 B2* | 7/2017 | McCullagh | .......... | G06Q 20/363 |
| 9,741,051 B2* | 8/2017 | Carpenter | .............. | G06Q 20/02 |
| 9,846,878 B2* | 12/2017 | Kumnick | ........... | G06Q 20/3674 |

(Continued)

FOREIGN PATENT DOCUMENTS

| | | |
|---|---|---|
| CN | 103718200 A | 4/2014 |
| WO | WO 2012/075417 A1 | 6/2012 |

(Continued)

OTHER PUBLICATIONS

Office Action issued in related Chinese Application No. 201680062253.9, dated May 6, 2021, 13 pages.

(Continued)

*Primary Examiner* — Steven S Kim
*Assistant Examiner* — Jeffrey L Licitra
(74) *Attorney, Agent, or Firm* — Haynes and Boone, LLP

(57) ABSTRACT

In some embodiments, a method for binding a user's information to a user's account with a payment service provider includes receiving a request to pay for a transaction using the user's account with the payment service provider. The request to pay specifies a funding instrument. Additionally, the payment service provider is a source of the funding instrument, and the transaction is between the user and a merchant application. The method also includes generating a common identifier (ID) corresponding to the funding instrument, and generating a payment token corresponding to the common ID and the funding instrument. The common ID is a non-transactable token associated with the merchant application and the user, and the payment token is a non-transactable token that corresponds to the common ID. The method further includes binding the user's payment service provider account to the payment token and the common ID.

18 Claims, 20 Drawing Sheets

(56) References Cited

U.S. PATENT DOCUMENTS

| | | | |
|---|---|---|---|
| 9,942,043 B2* | 4/2018 | Palanisamy | G06F 21/33 |
| 9,978,062 B2* | 5/2018 | Raj | G06Q 20/3821 |
| 10,037,526 B2* | 7/2018 | Campos | G06Q 20/40 |
| 10,147,089 B2* | 12/2018 | Powell | G06Q 20/382 |
| | | | 705/44 |
| 11,176,524 B1* | 11/2021 | Kurani | G06Q 20/0655 |
| 2012/0310838 A1 | 12/2012 | Harris et al. | |
| 2013/0212666 A1 | 8/2013 | Mattsson et al. | |
| 2014/0039990 A1 | 2/2014 | Georgi | |
| 2014/0089192 A1* | 3/2014 | Boding | G06Q 20/382 |
| | | | 705/44 |
| 2014/0114860 A1* | 4/2014 | Ozvat | G06Q 20/382 |
| | | | 705/64 |
| 2014/0344149 A1 | 11/2014 | Campos | |
| 2015/0032627 A1 | 1/2015 | Dill et al. | |
| 2015/0046338 A1* | 2/2015 | Laxminarayanan | |
| | | | G06Q 20/38215 |
| | | | 705/67 |
| 2015/0112870 A1* | 4/2015 | Nagasundaram | G06Q 20/401 |
| | | | 705/67 |
| 2015/0142595 A1 | 5/2015 | Acuna-Rohter | |
| 2015/0186871 A1 | 7/2015 | Laracey | |
| 2015/0199689 A1 | 7/2015 | Kumnick | |
| 2015/0254665 A1 | 9/2015 | Bondesen | |
| 2015/0356560 A1* | 12/2015 | Shastry | G06Q 20/38215 |
| | | | 705/64 |
| 2016/0092869 A1 | 3/2016 | Salama | |
| 2017/0109741 A1 | 4/2017 | Heiman | |
| 2017/0132633 A1* | 5/2017 | Whitehouse | G06Q 20/4014 |
| 2017/0262842 A1* | 9/2017 | Subbarayan | G06Q 20/38215 |
| 2020/0160325 A1* | 5/2020 | Kim | G06Q 20/3278 |

FOREIGN PATENT DOCUMENTS

| | | |
|---|---|---|
| WO | WO 2014/117095 | 7/2014 |
| WO | WO 2015/023305 A1 | 2/2015 |
| WO | WO 2017/035399 | 3/2017 |

OTHER PUBLICATIONS

Extended European Search Report issued in related European Application No. 18859552.4, dated May 19, 2021, 8 pages.

Search Report issued in related Singapore Appl. No. 10201908563T, dated Mar. 30, 2020, 2 pages.

* cited by examiner

PROCESSING A TRANSACTION USING ELECTRONIC TOKENS

BACKGROUND

Field

The present disclosure generally relates to systems and methods for processing transactions using electronic tokens.

Related Art

More and more consumers are purchasing items and services over electronic networks such as, for example, the Internet. Consumers routinely purchase products and services from merchants and individuals alike. The transactions may take place directly between a conventional or on-line merchant or retailer and the consumer, and payment is typically made by entering credit card or other financial information. Transactions may also take place with the aid of an on-line or mobile payment service provider such as, for example, VENMO®, Inc. of San Jose, Calif. Such payment service providers can make transactions easier and safer for the parties involved. Purchasing with the assistance of a payment service provider from the convenience of virtually anywhere using a mobile device is one main reason why on-line and mobile purchases are growing very quickly.

Many payment transactions enabled by online or mobile payment service providers such as, for example, retail purchases, payment transactions, and the like, are made electronically using electronic devices, such as mobile phones or mobile computing devices. For example, a consumer may install a payment application provided by the payment service provider on his or her mobile device to facilitate payments to various merchants or recipients.

Figure 1:
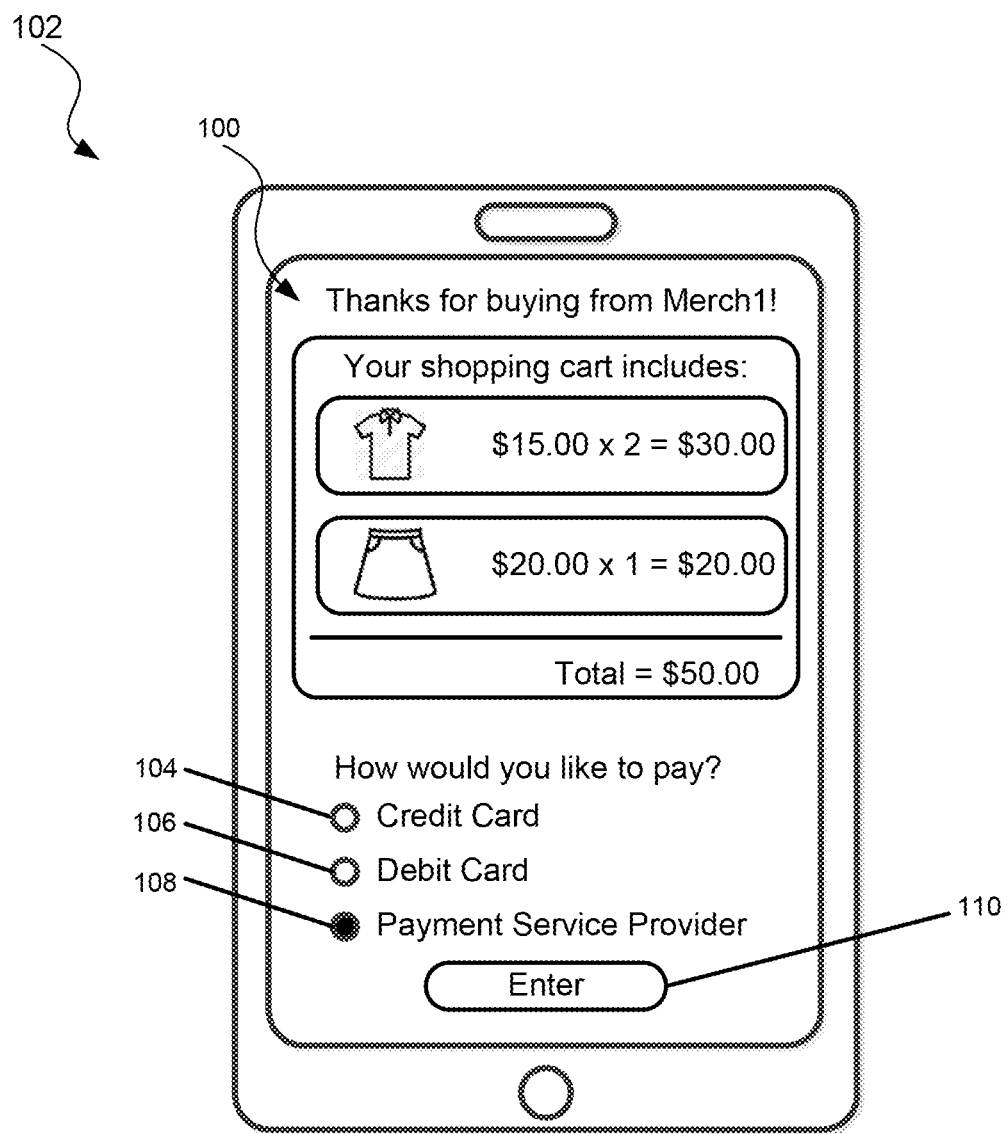
FIG. 1 is an example page that is displayed on a display of a user device by a merchant application.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

A user may use a user device to access a merchant application and desire to purchase products and/or services (e.g., collectively referred to as items) provided by a merchant via the merchant application. In an example, the merchant application is a mobile app installed on the user device. In another example, the merchant application is a web application accessible via a uniform resource locator (URL) to which a browser executing on the user device points. The user may interact with the merchant application to purchase items by placing them into an electronic shopping cart provided by the merchant application. Additionally, the merchant application may provide the user with the option to complete the purchase (or any transaction) using an account the user has with a payment service provider.

FIG. 1 is an example page 100 that is displayed on a display of a user device 102 by a merchant application. The merchant application may be provided by a merchant "Merch1," which provides the items for sale. Content of page 100 includes the user's selected item(s) along with the price and various ways for the user to pay for those item(s). For example, page 100 includes the option to pay with a credit card via user selectable object 104, debit card via user selectable object 106, or an account the user has with a payment service provider via user selectable object 108. The user's user account with the payment service provider is linked to one or more methods of payment, which may include the user's credit card, debit card, bank account (e.g., checking account), or digital wallet, and/or other forms of payment, etc. to which the user has given the payment provider server permission to access. The user may select one of these options by selecting the appropriate user selectable object and selecting a user selectable object 110, which is labeled "Enter," to confirm the transaction and submit a request to the merchant application to complete the transaction.

If the user selects user selectable object 104 to pay with a credit card, the user may be provided with a prompt to enter credit card information. If the user selects user selectable object 106 to pay with a debit card, the user may be provided with a prompt to enter debit card information. If the user selects user selectable object 108 to pay with the account the user has with the payment service provider, the merchant application may redirect the user device to the payment service provider for authentication of the user to the payment service provider. The merchant application may also have an account setup with the payment service provider in order to receive payments from users.

Figure 2A:
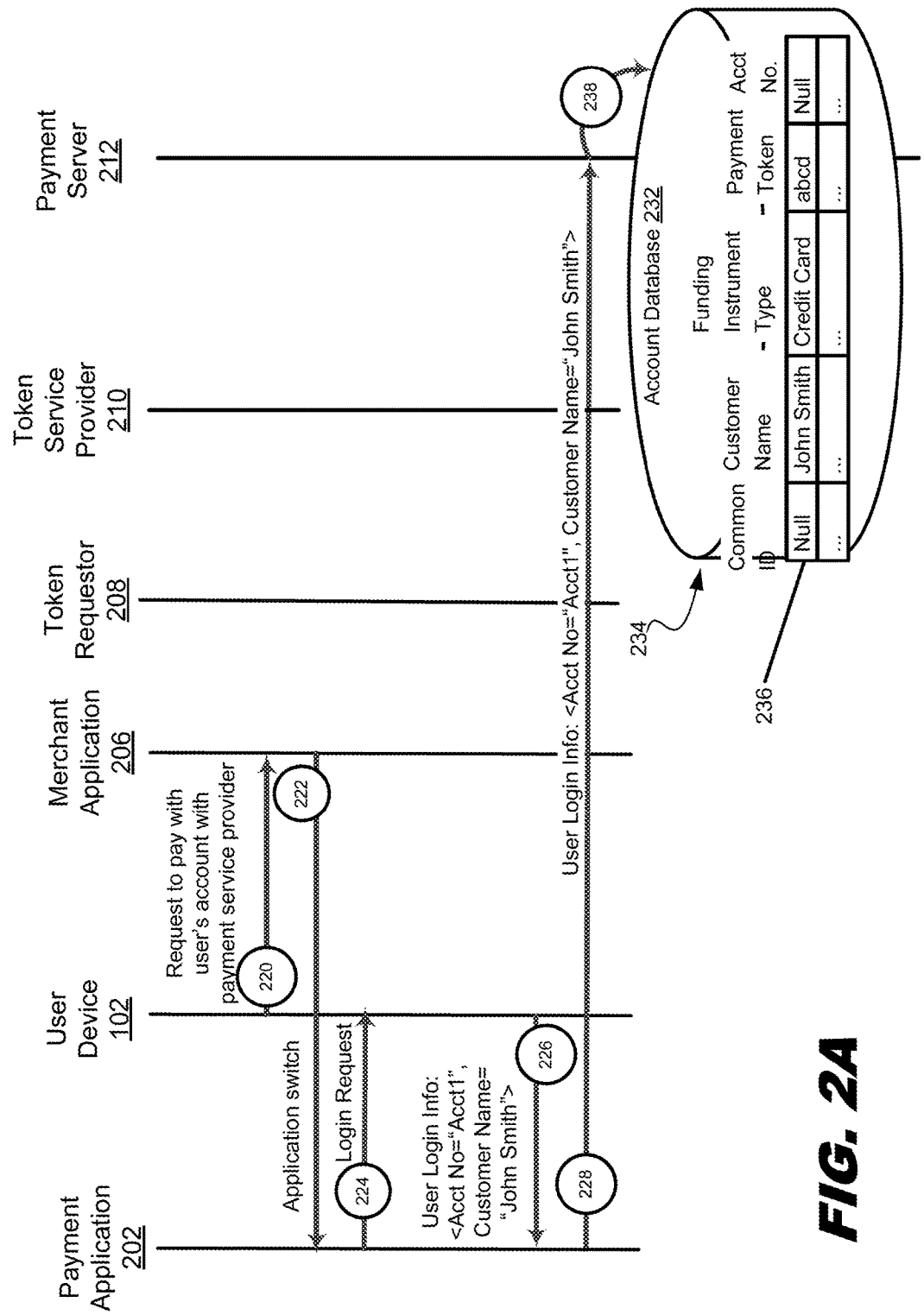
FIGS. 2A, 2B, and 2C is an example process flow for binding a user's information to the user's payment service provider account.
Figure 2B:
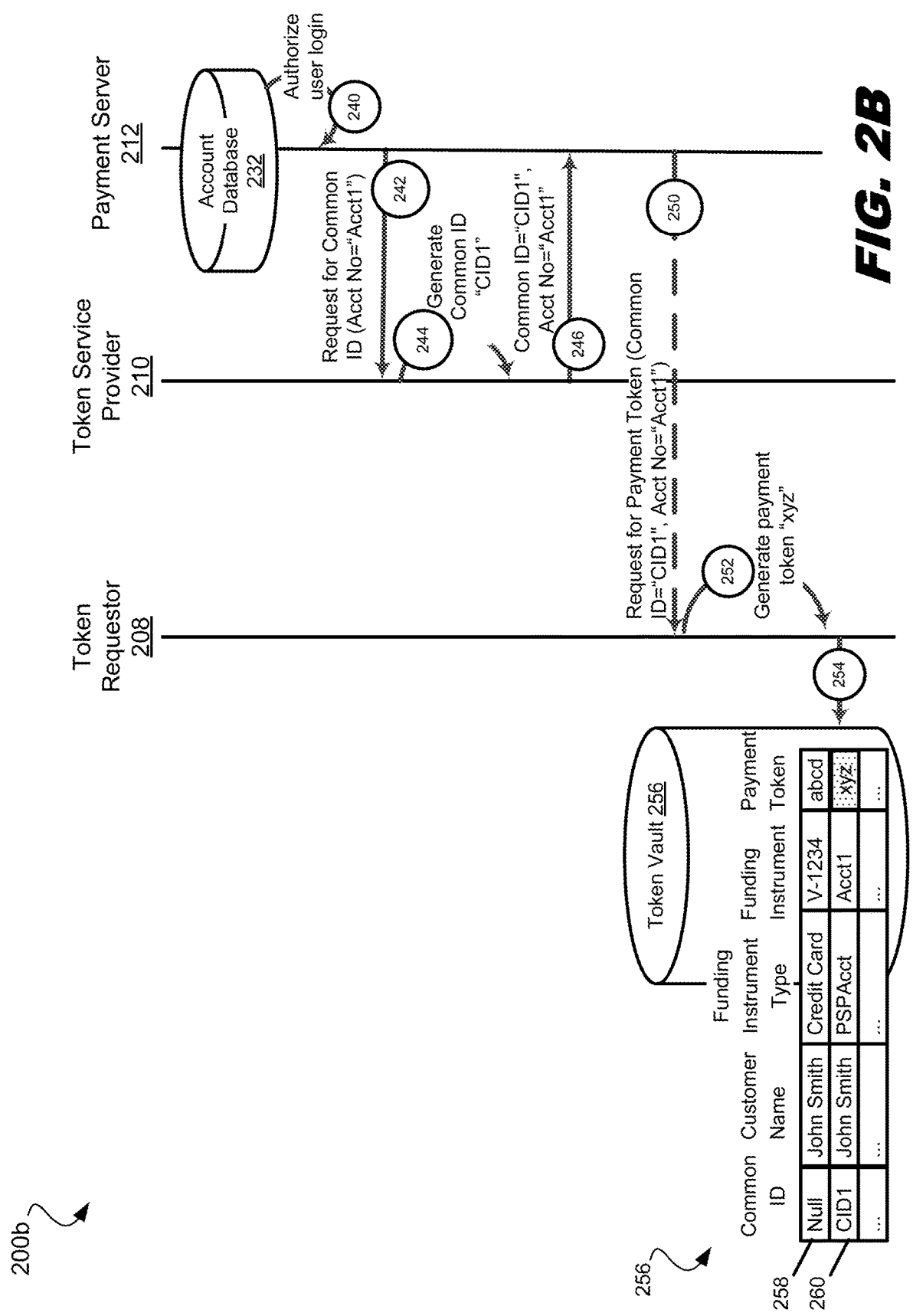
Figure 2C:
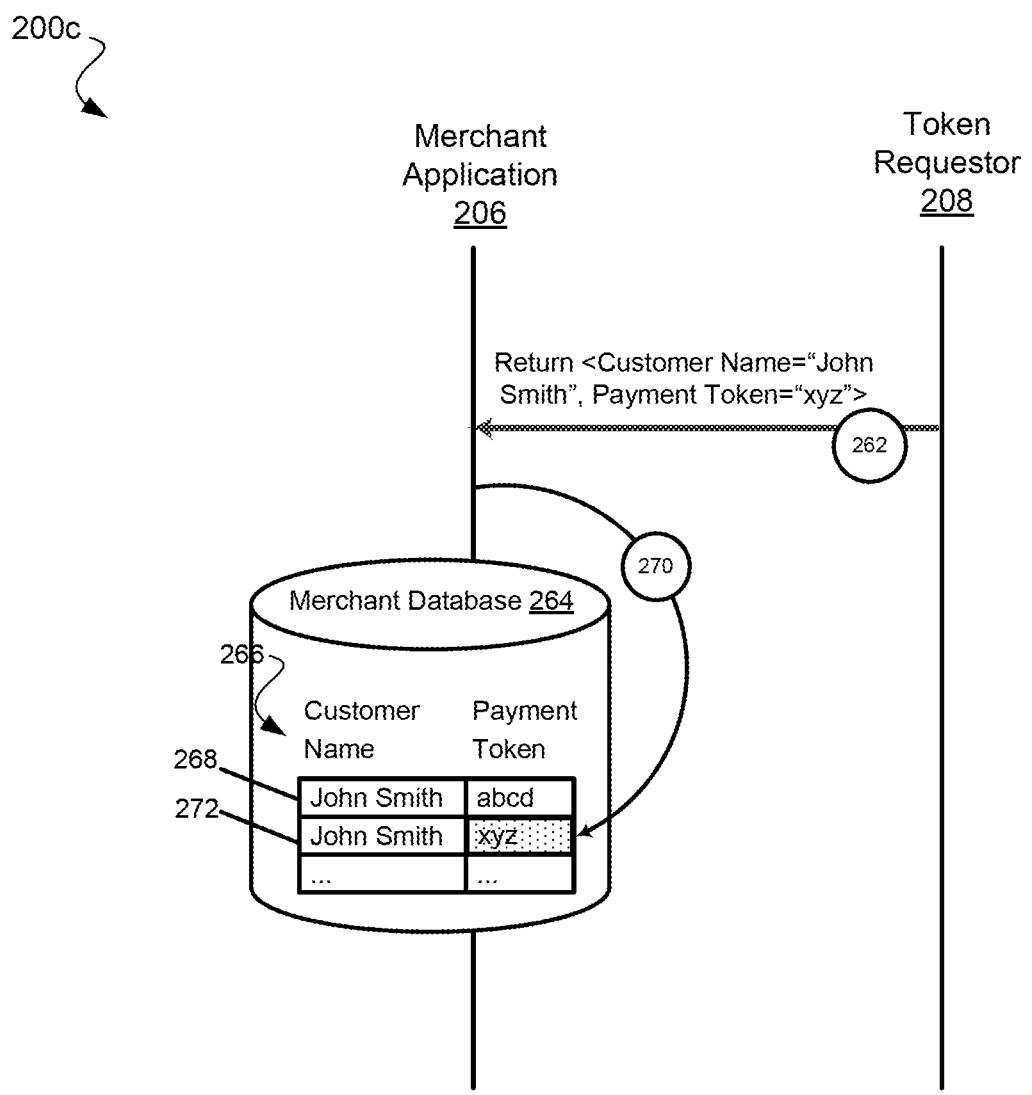

FIGS. 2A, 2B, and 2C is an example process flow 200a, 200b, and 200c for binding a user's information to the user's payment service provider account. Process flow 200a, 200b, and 200c shows interactions between a payment application 202, user device 102, merchant application 206, token requestor 208, token service provider 210, and payment server 212. A customer may use user device 102 to execute actions to complete a payment transaction with merchant application 206. A "customer" may also be referred to as a "user" in the present disclosure, and these two terms may be used interchangeably. The payment service provider, token requestor 204, and token service provider 206 may communicate with each other to generate identifiers (IDs) and bind the user's information with these IDs to assist in identifying the user and her account with the payment service provider for future payments.

In some examples, token requestor 208, token service provider 210, and/or the payment service provider are maintained by the same entity. In some examples, token requestor 208, token service provider 210, and/or the payment service provider are maintained by different entities and are in a trusted relationship with each other. In an example, token requestor 208 is BRAINTREE®, which specializes in mobile and web payment systems for companies, token service provider 210 is PAYPAL®, which provides an online payment system to users, and payment application 202 and payment server 212 are provided by the payment service provider. In some examples, the payment service provider is VENMO®, which provides a digital wallet to a user for making and sharing payments with other users. In this example, the user's VENMO® account may be used to pay the merchant, and may include one or more payment methods. A payment method may be, for example, a credit card, debit card, bank account, and/or a balance that the user has with the payment service provider. To complete the transaction, the payment method may be charged and the merchant may be credited the transaction amount. It should also be understood that token service provider 210 and/or token requestor 208 may be part of the payment service provider. In an example, token service provider 210 is part of the payment service provider and issues tokens, and the payment service provider processes these tokens.

The merchant may provide merchant application 206 to users. In an example, the user may receive merchant application 206 already installed on user device 102. In another example, the user may download merchant application 206 onto user device 102. In an example, payment application 202 is a mobile app installed on the user device. In another example, payment application 202 is a web application accessible via a URL to which a browser executing on the user device points. Token requestor 204 may process payments for merchant application 202, and merchant application 202 may accept payments from the payment service provider.

The user may interact with a merchant to buy an item, which may be a good or service offered by a merchant via merchant application 206. In FIG. 2A, at an action 220, user device 102 sends a request to pay with the user's account with the payment service provider to merchant application 206. In an example, the user uses user device 102 to select user selectable object 108 displayed on page 100 to send the request to pay with the user's account. In some examples, the user may interact with payment application 202 while merchant application 206 is active on user device 102 because services of payment application 202 may be accessible via merchant application 206. The user's request to pay with her payment service provider account may be a request to use a funding instrument (e.g., VENMO® account) that is provided by the payment service provider to pay for the transaction. The funding instrument is a payment source for the transaction. For example, the payment service provider is VENMO®, and the funding instrument is the user's VENMO® wallet, which may include one or more payment methods (e.g., credit card, debit card, checking account, etc.). In this example, the payment service provider is a source of the funding instrument.

At an action 222, merchant application 206 receives the request to pay with the user's payment service provider account and switches the active application on user device 102 to payment application 202. An active application refers to the application that is currently displaying data on user device 102. Merchant application 206 may switch the active application on user device 102 to payment application 202 by redirecting the user device to the payment application. In an example, merchant application 206 activates payment application 202, which may be installed on user device 102, to display data on user device 102. In another example, merchant application 206 triggers a browser executing on user device 102 to point to a URL that references content provided by payment application 202.

Payment application 202 may perform actions to authenticate the user. At an action 224, payment application 202 sends a page including a login request to user device 102 for authentication to the payment service provider. At an action 226, user device 102 sends the user's login information to payment application 202. In the example illustrated in FIG. 2A, the user's login information includes the user's account number, which is specified as "Acct1," and the customer's name, which is specified as "John Smith." This is not intended to be limiting and the user login information may include additional or different information from that shown in FIG. 2A. In an example, the login information also includes the user's user credentials, which may be the user's username and password.

At an action 228, payment application 202 receives the user login information from user device 102 and sends the user login information to payment server 212. Once the user has authenticated herself to payment application 202, payment application 202 may identify the user and therefore may send an account number or identifier that can uniquely identify that user back to payment server 212. In an example, payment application 202 sends the user's account number or some derived identifier of the account number and a session ID to payment server 212 to identify the user for future interactions. Payment server 212 may be coupled to an account database 232 that stores user account information. Account database 232 may be maintained by the payment service provider and be used to authenticate users desiring to access services of the payment service provider. Account database 232 includes a user account table 234 having a Common ID, Customer Name, Funding Instrument Type, Payment Token, and Acct No columns. User account table 234 includes an entry 236, which specifies that a user having the customer name "John Smith" is associated with a credit card funding instrument type and a payment token "abcd." In an example, the funding instrument is a credit card "V-1234" (e.g., a VISA® credit card having the last four digits "1234"), and a credit card company provided the user with this credit card for authorizing payment for goods or services on credit. Entry 236 was pre-existing from a previous interaction where the same customer shared her credit card information as the funding instrument.

Payment server 212 may successfully authenticate the user if an entry in user account table 234 includes the customer name specified in the user login information in the Customer Name field and also includes the account number specified in the user login information in the Payment Card field. If payment server 212 does not find the provided login information in account database 232, payment server 212 may determine that the user authentication failed. In this example, payment server 212 may send an error message indicating that the provided login information failed to payment application 202, which may then display this error message to the user. Actions 224, 226, 228, and 238 may then be repeated. For example, payment application 202 may send the user another login request, the user may again enter login information into user device 102 again, and so on.

Payment server 212 may allow the user a threshold number of failed login attempts before blocking the user from providing her login information again. For example, the provided login information may include a customer name stored in account database 232, but not the correct account number corresponding to this customer name. In this example, payment server 212 may lock the account corresponding to the customer name until the user contacts the payment service provider through a communications medium approved by the payment service provider. For example, the payment service provider may request the user to call the token service provider at a particular number, send a text message to the payment service provider with a particular code, and/or send an email to the payment service provider, etc., to unlock the user's account. After the user's account is unlocked, actions 224, 226, 228, and 238 may be repeated again.

If payment server 212 finds the provided login information in account database 232, process flow may proceed from action 238 to an action 240 in FIG. 2B, in which payment server 212 successfully authenticates the user and authorizes the user login. If payment server 212 authenticates the user, the payment service provider knows the identity of the user and also that the user is attempting to complete a payment transaction with a merchant. After payment server 212 authorizes the user login, process flow may proceed from action 240 to an action 242, in which payment server 212 sends a request for a common identifier (ID) to token service provider 210. The request for the common ID also includes the account number provided in the user login information (and belonging to the user "John Smith"). Payment server 212 may request a common ID from token service provider 210 if the user desires to pay a merchant using an account she has with the payment service provider (see action 220 in FIG. 2A).

At an action 244, token service provider 210 receives the common ID request including the account number "Acct1" from payment server 212, and generates a common ID "CID1" that corresponds to the user's "Acct1." A common ID may vary from context to context. For example, in the context in FIGS. 2A-2C, the user's identity on her account with the payment service provider is bound to the partner requesting the common ID. For example, payment server 212 may request a common ID for an authenticated user, and would be provided with common ID "CID1." At a later point in time, if another partner offers the user the ability to pay with the payment service provider and this partner requests a common ID for the same user, token service provider 206 may generate a common ID "CID2," which is different from the common ID issued to the first partner. Merchant application 202 may be unaware of the common ID. As will be explained further below, the user's account with the payment service provider (VENMO® account) will be bound to a common ID. In an example, this binding happens once between the user's identity on the payment service provider and the user's identity on token service provider 206 (e.g., common ID "CID1"). In this example, for a single binding, a single common ID (e.g., "CID1") may be common across any merchant that the payment service provider is made available on.

Payment server 212 may recognize "Acct1," which was included in the user login information in actions 226 and 228, as being the user's requested funding instrument in relation to the user's account with the payment service provider. Accordingly, payment server 212 may include "Acct1" in the request for a common ID to token service provider 210 so that token service provider 210 provides both "Acct1" and the generated common ID back to payment server 212. In this way, payment server 212 may easily pair these two parameters together and know to associate the common ID "CID1" with "Acct1."

A common ID is a non-transactable token that is used to identify an associated underlying funding instrument (e.g., "Acct1") associated with a transaction. A non-transactable token refers to a token that if sent over a card network (e.g., credit card network) would not be routable back to the originator of the token. For example, a credit card network that receives this non-transactable token may not recognize its originator or how to get it back to its originator. An originator of a token may refer to the entity that generated the token. Additionally, an originator of a token may also refer to an entity that has a trusted relationship with the entity that generated the token. In an example, the originator is token service provider 210 and generates a common ID in the context of a user request to charge the user's account with the payment service provider to pay for a transaction with a merchant. In an example, the common ID is a 16-19 digit number starting with an "8."

The common ID may be an attribute that is used to uniquely represent a relationship between the user, the commerce partner/merchant (e.g., merchant application 206), and the payment service provider/payment instrument (e.g., the user's payment service provider account). A partner may refer to a merchant that has a relationship with the payment service provider. The common ID may be an internal construct and can be used by commerce partners of the payment service provider. The common ID may be used to aggregate transactions and for account management. Additionally, the common ID may be transparent to the user and be used to identify the user as a consumer of a good or service. The common ID may be defined as the combination of a merchant/social commerce partner ID, and/or the identity of the user on the partner and/or the funding instrument/ wallet information of the user. The exact combination or configuration differs by use case and may be driven by product design and business need.

Moreover, the common ID may be associated with an ID of the merchant, an ID of the user requesting the transaction, and/or a funding instrument associated with the user. The common ID may indicate the user's consent for an entity (e.g., website, payment service provider, or bank, etc.) to perform a specific activity or set of activities in a given environment. For example, the common ID may indicate the user's consent for an entity to charge a funding instrument (e.g., the user's payment service provider account identified by "Acct1") corresponding to the common ID to complete a payment transaction. A charge to a funding instrument that corresponds to a common ID may refer to the charging of a payment method within the funding instrument. The common ID may enable users to experience seamless user experiences with security and context-based data sharing with appropriate controls. In an example, the common ID is a 13-digit number.

At an action 246, token service provider 210 sends the common ID "CID1" and account number "Acct1," which are both associated with John Smith's account, to payment server 212. At an action 250, payment server 212 sends a request for a payment token to token requestor 208. The payment token request also includes the common ID "CID1"

and account number "Acct1" associated with John Smith's account. Action 250 is associated with a dashed line to indicate a "notification" type event that is triggered by the common ID creation. At an action 252, token requestor 208 receives the payment token request including the common ID "CID1" and the account number "Acct1," and generates a payment token "xyz." A payment token may be an internal construct issued by token requestor 204 to commerce partners of token requestor 204 and/or the payment service provider. As will be explained further below in relation to FIGS. 4A-4D, the payment token "xyz" is a non-transactable token that may be used as a handle to John Smith's account corresponding to the funding instrument "Acct1."

At an action 254, token requestor 208 stores the payment token "xyz" into a token vault 256. Token requestor 208 maintains token vault 256 and stores information associated with user accounts and their associated payment tokens and common IDs (if applicable) into the token vault. Token vault 256 includes a user account table 256 having Common ID, Customer Name, Funding Instrument Type, Funding Instrument, and Payment Token columns. In user account table 256, a first entry 258 indicates that John Smith (customer name field) has a credit card (funding instrument type field) identified by "V-1234" (funding instrument), which corresponds to a payment token "abcd." Token requestor 208 previously generated the payment token "abcd" and stored this payment token into token vault 256. Accordingly, token requestor 208 has information about John Smith's credit card and knows that this funding instrument is stored in token vault 256.

A second entry 260 indicates that John Smith has an account "PSPAcct" provided by the payment service provider (funding instrument type field) and this account corresponds to an underlying funding instrument "Acct1," which corresponds to the payment token "xyz." As discussed above, the payment token "xyz" was generated by token requestor 208 at action 252 and corresponds to the common ID "CID1" generated by token service provider 210 at action 244. Accordingly, the user's payment service provider account is bound to the payment token and the common ID. Token requestor 204 may bind the user's payment service provider account to the payment token and common ID by inserting them into the same entry in user account table 256. Token requestor 204 may asynchronously send this information to the payment service provider as soon as token requestor 204 has this new binding created between the user's payment service provider account and the user's identity on token requestor 204.

Token requestor 208 maps the payment token "xyz" to the common ID "CID1" included in the payment token request by inserting them into the same entry. In response to receiving a payment token request from payment server 212, token requestor 208 may know that the payment token is being generated for a funding instrument type provided by the payment service provider. Additionally, token requestor 208 may know that "Acct1" belongs to John Smith because token requestor 208 is in a trusted relationship with the payment service provider. Although token requestor 204 and the payment service provider are in a trusted relationship, it may be possible that token requestor 204 knows nothing more about the user's identity other than the common ID associated with the user's payment service provider account, where "Acct1" is a unique account number. The common ID "CID1" may identify "Acct1" as the funding instrument to be charged for the user's payment transaction if the user desires to pay a merchant with her payment service provider account (e.g., VENMO® account or wallet).

Process flow may proceed from action 254 to an action 262 in FIG. 2C, in which token requestor 208 returns the user's customer name "John Smith" and payment token "xyz" to merchant application 206. Merchant application 206 maintains a merchant database 264 including a customer-token table 266 having Customer Name and Payment Token columns. Customer-token table 260 includes a first entry 268 specifying that John Smith (customer name field) is associated with the payment token "abcd." At an action 270, merchant application 206 inserts an entry 272 including the customer's name "John Smith" and payment token "xyz" into customer-token table 266. Second entry 272 specifies that John Smith is associated with the payment token "xyz." Accordingly, merchant application 206 has possession of a payment token that is associated with the user and also associated with a funding instrument type provided by the payment service provider.

In the future, if the user "John Smith" sends a request to merchant application 206 to pay using a particular funding instrument (e.g., credit card or account with the payment service provider), merchant application 206 may retrieve the appropriate payment token from merchant database 264 and provide the payment token to token requestor 208 for further transaction processing. Token requestor 204 may process transactions for merchants. In keeping with the above examples, the payment token "abcd" corresponds to funding instrument "V-1234," and the payment token "xyz" corresponds to the funding instrument "Acct1." Each time the user selects to pay with her credit card (e.g., by selecting user selectable object 104 on page 100 in FIG. 1), merchant application 206 may receive the user's request to pay with her credit card, identify the payment token "abcd" corresponding to the payment option, and send the payment token "abcd" to token requestor 204 for further processing. In contrast, each time the user selects to pay with her account with the payment service provider (e.g., by selecting user selectable object 108 on page 100 in FIG. 1), merchant application 206 may receive the user's request to pay with the payment service provider, identify the payment token "xyz" corresponding to the payment option, and send the payment token "xyz" to token requestor 204 for further processing. Processing of the payment token leads to identification of the underlying funding instrument that should be charged to complete the requested payment.

As will be explained in further detail below, token requestor 208 may obtain a transactable token "T1" corresponding to the common ID and representative of the transaction associated with action 220. Token requestor 208 may route the transactable token to a card network, which determines the originator of the transactable token. The card network may then return the transactable token back to the originator, which is token service provider 206. Token service provider 206 receives the transactable token from the card network and de-tokenizes the transactable token. Token service provider 206 identifies, based on de-tokenizing the transactable token, the common ID and identifies the funding instrument corresponding to the common ID. Token service provider 206 sends a charge request to the payment server 212, where the charge request may specify the funding instrument "Acct1," transaction amount "$50," and the merchant's ID.

Payment server 212 receives the charge request and selects a payment method within the funding instrument to charge for the transaction. Payment server 212 sends a charge request including a set of parameters to an issuing bank that approves or rejects charges to the payment method. The set of parameters includes the payment method, the user's name "John Smith," and an amount of the transaction "$50." The issuing bank approves or rejects the charge request to the payment method and sends a charge response to payment server 212. The charge response specifies the approval or rejection of the charge to the payment method. Payment server 212 receives the charge response from the issuing bank. If the charge response specifies an approval of the charge to the payment method, payment server 212 forwards a success message to the token service provider 206, which forwards the success message to merchant application 202, which forwards the success message to user device 102. If the charge response specifies a rejection of the charge to the payment method, payment server 212 forwards a reject message to the token service provider 206, which forwards a reject message to merchant application 202, which forwards a reject message to user device 102.

Figure 3:
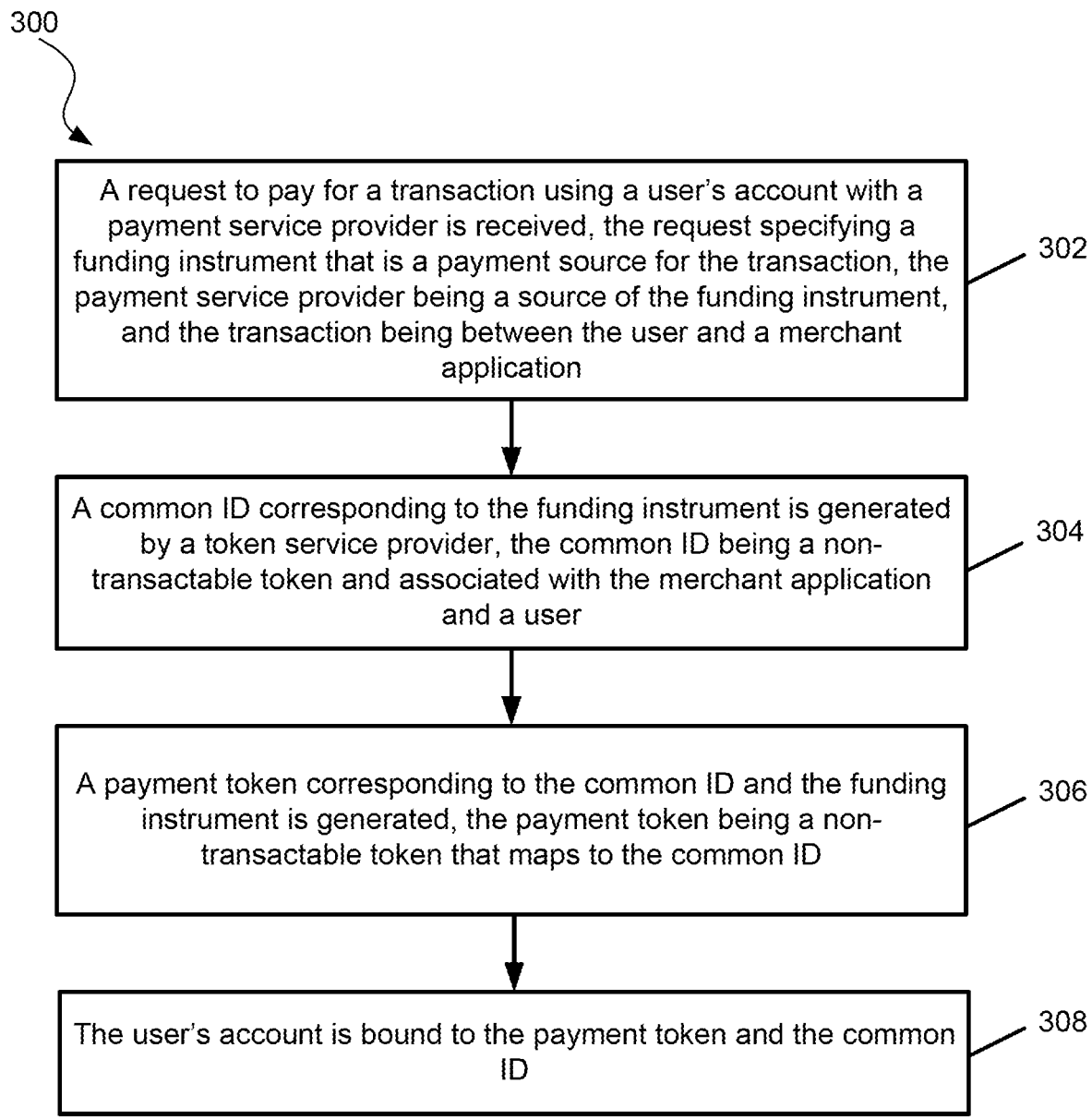
FIG. 3 is a flowchart illustrating an example method of binding the user's information to the user's payment service provider account.

FIG. 3 is a flowchart illustrating an example method 300 of binding a user's information with the user's payment service provider account. Method 300 is not meant to be limiting and may be used in other applications other than the payment applications discussed below. Method 300 includes steps 302, 304, 306, and 308.

At a step 302, a request to pay for a transaction using a user's account with a payment service provider is received, the request specifying a funding instrument that is a payment source for the transaction, the payment service provider being a source of the funding instrument, and the transaction being between the user and a merchant application. In an example, payment application 202 receives a request to pay for a transaction using a user's account with a payment service provider, the request specifying a funding instrument that is a payment source for the transaction, the payment service provider being a source of the funding instrument, and the transaction being between the user and a merchant application. In an example, the funding instrument that is the payment source for the transaction is the user's account with the payment service provider.

At a step 304, a common ID corresponding to the funding instrument is generated by the token service provider, the common ID being a non-transactable token and associated with the merchant application and user. In an example, token service provider 210 generates a common ID "CID1" corresponding to the funding instrument "Acct1," the common ID "CID1" being a non-transactable token and associated with the merchant application 206 and the user. The common ID is issued against the user's account with the payment service provider. For example, the common ID "CID1" is issued for the user's VENMO® account.

At a step 306, a payment token corresponding to the common ID and funding instrument is generated, the payment token being a non-transactable token that maps to the common ID. In an example, token requestor 208 generates the payment token "xyz" corresponding to the common ID "CID1" and funding instrument "Acct1," the payment token "xyz" being a non-transactable token that maps to the common ID "CID1." At a step 308, the user's payment service provider account is bound to the payment token and the common ID. In an example, token requestor 208 binds John Smith's payment service provider account to the payment token and common ID by inserting this information into a common entry in token vault 256.

It should be understood that additional processes may be performed before, during, or after steps 302, 304, 306, and/or 308 discussed above. It is also understood that one or more of the steps of method 300 described herein may be omitted, combined, or performed in a different sequence as desired.

After the user's account is bound to the payment token and common ID, merchant application 202 may send that payment token "xyz" to token requestor 208 in response to the user selecting to pay with the user's payment service provider account. The binding may happen once such that when merchant application 202 sends the payment token "xyz" to token requestor 208, token requestor 208 may identify the common ID "CID1" corresponding to the user's account and set into motion actions that charge the user's payment service provider account.

Figure 4A:
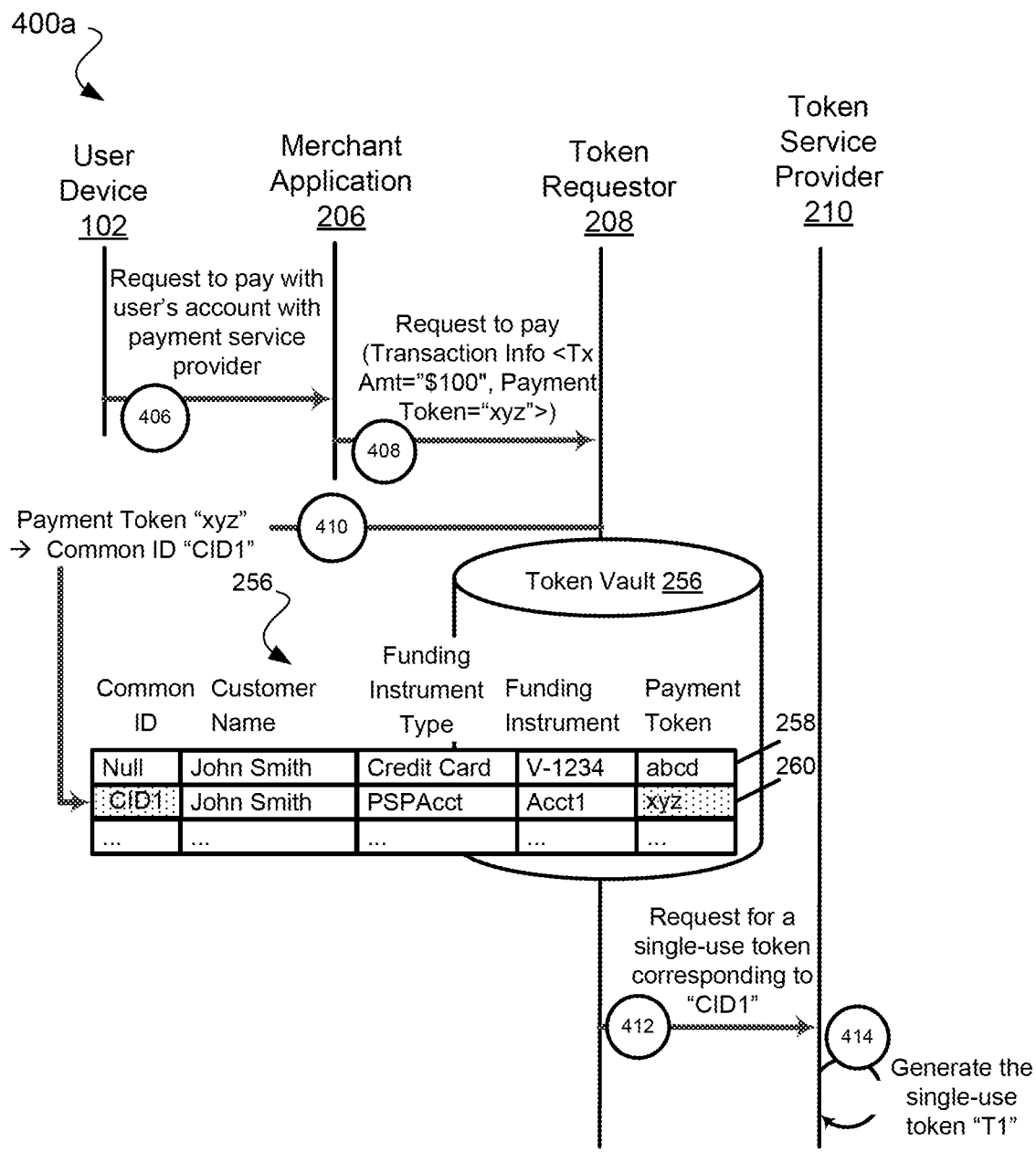
FIGS. 4A, 4B, 4C, and 4D is an example process flow for charging an underlying funding instrument associated with a user's request to pay with her account with the payment service provider.

FIGS. 4A, 4B, 4C, and 4D is an example process flow 400a, 400b, 400c, and 400d for charging an underlying funding instrument associated with a user's request to pay with her account with the payment service provider. If the funding instrument is the user's account with the payment service provider, charging the funding instrument refers to charging a payment method (e.g., credit card or checking account) within the funding instrument. Process flow 400a, 400b, 400c, and 400d show interactions between user device 102, merchant application 206, token requestor 208, token service provider 210, payment server 212, card network 402, and issuing bank 404 that lead to the underlying funding instrument associated with the user's payment service provider account being charged. In FIG. 4A, at an action 406, user device 102 sends a request to pay with the payment service provider to merchant application 206. In an example, a user may desire to pay for an item and complete a transaction by using an account the user has with the payment service provider. In an example, the payment service provider is VENMO®, and the user desires to use her VENMO® account to pay the merchant.

At an action 408, merchant application 206 receives the request to pay with the user's payment service provider account from user device 102, and sends the user's request to pay including transaction information to token requestor 208. Token requestor 208 may process payments for merchant application 206. In an example, merchant application 206 is registered with token requestor 208. The transaction information is associated with the request to pay with the user's payment service provider account and includes the transaction amount "$100" and a payment token "xyz," which was previously generated by token requestor 208 and stored in token vault 256 (see actions 252 and 254 in FIG. 2B). The transaction information may be sent to token requestor 208 in a variety of ways. In an example, merchant application 206 invokes an application programming interface (API) exposed by token requestor 208 or the payment service provider to cause the payment transaction information to be sent to token requestor 208.

Token requestor 208 receives the request to pay including the transaction information from merchant application 206. At an action 410, token requestor 208 searches token vault 256 for an entry including the payment token "xyz" and determines whether the payment token corresponds to a common ID. A payment token may correspond to a common ID if the common ID field has a value of a particular format (e.g., a 13-digit format, one or more alphanumeric symbols, etc.). In response to a determination that the payment token "xyz" is not stored in token vault 256, token requestor 208 may send a reject transaction message to the merchant application.

In the example illustrated in FIG. 4A, an entry 258 includes the payment token "abcd," which does not correspond to a common ID because the Common ID field in this entry has a null value. This is not intended to be limiting, and a particular value may be different from null to indicate that a payment token does not correspond to a common ID. For example, payment tokens that do not correspond to common IDs may have a "0" stored in the entry's Common ID field.

A payment token that does not correspond to a common ID may identify a funding instrument in its corresponding entry that can be charged for the transaction and sent over a card network for re-routing to the funding instrument source. For example, referring to entry 258, token requestor 208 may charge the funding instrument "V-1234" to pay for a transaction if the token requestor receives the payment token "abcd" from a merchant application. In this example, token requestor 204 may send a charge request specifying the funding instrument "V-1234," customer's name "John Smith," and transaction amount "$100" to the card network, which may be a credit card network. The credit card network may receive the charge request and determine that a particular credit card company issued the funding instrument "V-1234" identified in the charge request. The credit card company that issued the funding instrument "V-1234" may be referred to as the source of the funding instrument or funding instrument source. The credit card network may route the charge request to the funding instrument source, which may then charge the transaction amount to the credit card "V-1234."

In the example illustrated in FIG. 4A, token requestor 208 determines that the payment token "xyz" corresponds to the common ID "CID1" because this payment token and common ID are associated with the same funding instrument "Acct1" and funding instrument type. As discussed above, token service provider 206 generates the common ID "CID1" in response to a common ID request from payment server 212 (see actions 242 and 244 in FIG. 2B). Additionally, the common ID corresponds to "Acct1." If token requestor 208 determines that the payment token corresponds to a common ID, token requestor 208 may determine that additional information should be requested before it is possible to charge the funding instrument in entry 260 in order to complete the transaction. For example, token requestor 208 and a card network may be unaware of how to charge the funding instrument "Acct1" of the "PSPAcct" funding instrument type in entry 260 because "Acct1" is not an actual funding instrument outside of the context of token service provider 210 or the payment service provider. The funding instrument "Acct1" in this example represents the user's account with the payment service provider (e.g., VENMO® wallet) as a whole opaque container and not a chargeable funding instrument within this account. Additionally, unlike the above example in which token requestor 208 sends the funding instrument "V-1234" in entry 258 over the credit card network, the funding instrument "Acct1" specified in entry 260 may not be understandable by the credit card network.

The funding instrument houses one or more payment methods that may be charged in order to complete the transaction. To gather more information to identify the appropriate payment method within the funding instrument to charge for the payment transaction, token requestor 208 sends a request for a transactable token corresponding to the common ID "CID1," which corresponds to the payment token "xyz," to token service provider 210. In an example, the transactable token may be a single-use token that can be consumed once and then exhausted. At an action 412, token requestor 208 sends a request for a single-use token corresponding to the common ID "CID1" to token service provider 210. Token requestor 208 may send the request for the single-use token along with the common ID "CID1" in a variety of ways. In an example, token requestor 208 invokes a tokenization API that is exposed by token service provider 210 and that causes token service provider 210 to generate a transactable token.

The transactable token may represent a manifestation of the common ID in real time that allows for the enablement of specific transaction(s) in the context and parameter set(s) as defined by the user, environment, and/or token service provider. The single-use token may represent a particular transaction, and each time the user desires to pay with her account provided by the payment service provider, token requestor 208 may request a transactable token representing the particular transaction from token service provider 210. The transactable token may be used for payment or non-payment purposes. In some examples, the transactable token serves as a proxy for a funding instrument or an account with the payment service provider. The transactable token may be an open loop or closed loop ID that serves as a proxy for conveying the user's consent for a particular transaction and for a specific environment. The particular transaction may be a financial or a non-financial transaction corresponding to a specific interaction for that specific environment. An open loop may refer to an ID that is sufficiently recognizable to be routable by existing routing networks (e.g., credit card company networks) back to the token service provider (e.g., PAYPAL®) or other such appropriate ecosystems based on the context of the transaction. A closed loop may refer to an ID that is recognizable only by the token service provider that issued the token or limited ecosystem based on business needs.

Token service provider 210 receives the request for the single-use token corresponding to the common ID "CID1." At an action 414, responsive to the single-use token request, token service provider 210 generates a single-use token "T1" that corresponds to the common ID "CID1." As will be explained further below, a single-use token may eventually be routed back to the token service provider, and consumed once and then exhausted by the payment service provider.

Additionally, token service provider 210 may issue the single-use token and define a set of parameters surrounding the single-use token. One or more parameters of the set of parameters may include, but are not limited to, a card network (e.g., the name of a credit card company's network); a time to live, which is the period from the moment of issuance until the transactable token expires or is no longer valid (e.g., 20 seconds, 20 minutes, 2 minute, 8 hours, 2 days, 2 year, etc.); scheme/BIN (e.g., debit, credit, prepaid, or token); currency accepted (e.g., US dollars, Euro, Canadian dollar, Vietnamese dong, etc.); merchant type (MCC) (e.g., digital goods, travel, online retail store, etc.); merchant information, which may include a choice of merchant preferences such as funding sources, brands, closed loop, dollar limits, etc.; merchant location, which may be the country in which the merchant is registered (e.g., United States or Canada), terminal location (e.g., Global Positioning System coordinates or registered card reader terminal location), or whether the merchant is online only or offline only; consumer location radius (e.g., GPS coordinates of the user's mobile device); security features (e.g., cryptogram required or step-up authentication required); routing mechanism (e.g., open or closed loop); type of interaction, which may include funding (e.g., private label credit card (PLCC), points, cards, or banks), identity (e.g., access to hotel, gym or car or other environments that need identity verification), and contextual information (e.g., address, etc.); and amount (e.g., the amount that can be used for payment authorization using the token). Additionally, the transactable token may also have a maximum value that may be charged to the associated underlying funding instrument. In an example, the maximum value is the initial amount of the transaction (e.g., the transaction amount of $100 specified in the transaction information at action 408).

In some examples, the transactable token includes an expiration date, a token ID, and a security context. The token ID may be a number that identifies the token and may be in the same format as a credit card or debit card number. The token ID may be thought of as a "transactable primary account number" (TPAN) because the token ID is not an actual credit card or debit card number that can be used as a funding source in and of itself, but is a representation of the transaction and can be used by the merchant to obtain funding for the transaction from the user's linked funding instrument.

Token service provider 210 may generate a transactable token such that it is easily routable by a credit card network. In an example, the transactable token is a 16-digit number with an expiration date or expiration time (e.g., 20 minutes) and may be processed like a credit card or debit card. In this example, the transactable token may have the same format (e.g., 16-digit number) as a credit card or debit card, but may not be an actual credit card issued by a credit card company or debit card issued by a bank. It may be advantageous to generate a transactable token having the same format as a credit card or debit card because credit card networks are already configured to handle and route 16-digit card numbers to their originators. Accordingly, companies may be able to adopt techniques disclosed in the present disclosure without modifying their systems. In some examples, the token is replaced with a Cryptogram to provide additional security.

If the transactable token is a 16-digit number that is generated by token service provider 210 and routed to a credit card network, the credit card network may identify the originator of the TPAN associated with the transactable token as being token service provider 210 and thus route the transactable token back to token service provider 210 for further processing. In this example, the transactable token may be routed to token service provider 210 even though the transactable token is not a credit card or debit card transaction. In some examples, the security context is a security code. The security context may be in the same format as a CVV (card verification value) or CSC (card security context). In such an example, the security context may be a three digit number. The security context may be dynamic and change with each transaction. In an example, the expiration date is in the MM/YY format.

Figure 4B:
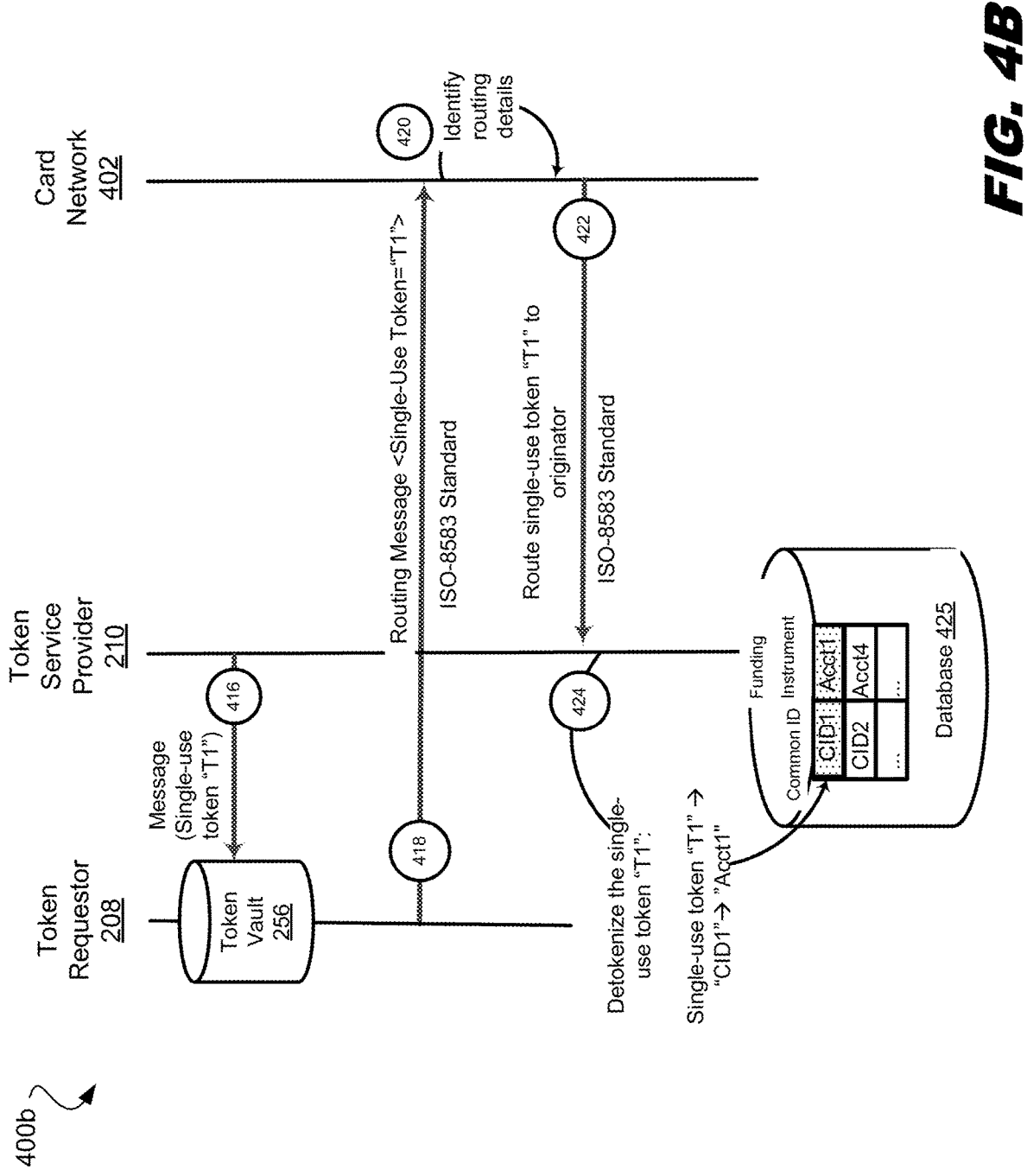
Figure 4C:
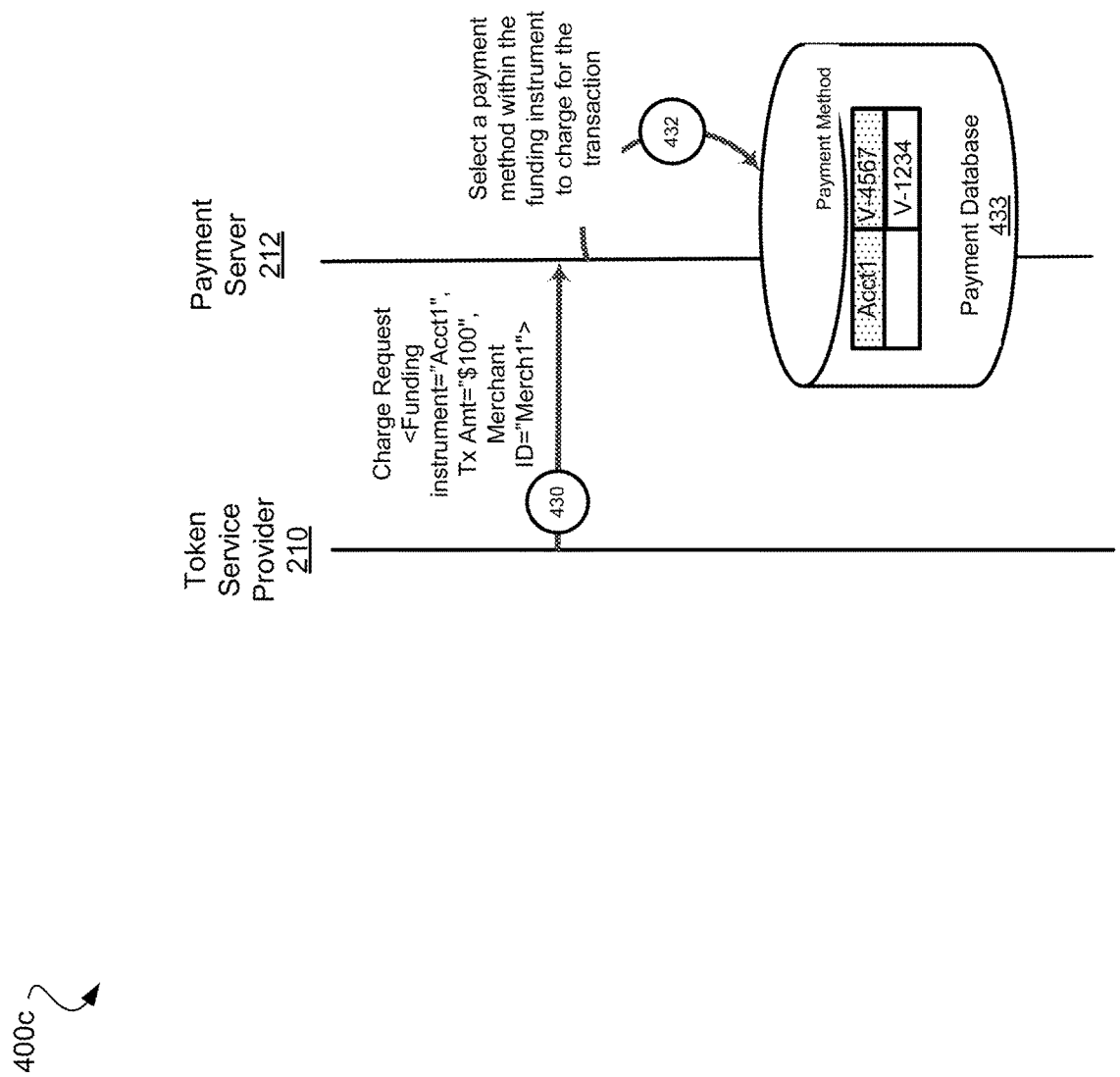

Process flow may proceed from action 414 to an action 416 in FIG. 4B, in which token service provider 210 stores the single-use token "T1" in token vault 256 maintained by token requestor 208. Accordingly, token requestor 208 possesses a single-use token "T1" that corresponds to the payment request in action 406 and the common ID "CID1." Token service provider 210 may store the single-use token at token vault 256 in a variety of ways. In an example, token service provider 210 invokes an API exposed by token requestor 208 to cause the single-use token "T1" to be sent to token requestor 208 and stored at token vault 256. For example, the API may be a tokenization issuance API that is published and accessible to token service provider 210.

Token requestor 208 may push the transaction information associated with the payment request in action 406 to a card network 402. In an example, card network 402 may be a credit card network, debit card network, automated clearing house (ACH), or other type of network that processes electronic financial transactions. At an action 418, token requestor 208 sends a routing message including the single-use token "T1" to card network 402 for routing to the token's originator, which generated the token. In an example, the routing message is sent using the ISO-8583 standard, which has specified fields. For example, under the ISO-8583 standard, the routing message may include the merchant ID that identifies the merchant, merchant name, merchant category code (MCC) that specifies items provided by the merchant, and transaction amount.

Card network 402 receives the message and routes the transaction information in accordance with the account type. For example, card network 402 may identify the source of the single-use token "T1," and route the transaction information accordingly. At an action 420, card network 402 identifies the routing details associated with the single-use token "T1." At an action 422, card network 402 routes the single-use token "T1" back to the originator of the single-use token "T1." Card network 402 may send the single-use token "T1" to token service provider 210 using the ISO-8583 standard.

In an example, card network 402 identifies token service provider 210 as being the originator of the single-use token "T1." In this example, card network 402 may identify the TPAN of the single-use token, and recognize that the first "X" digits of the TPAN belong to tokens generated by token service provider 210, where X is a number greater than one. In an example, token service provider 210 is VENMO®, and card network 402 determines that the single-use token "T1" is representative of a VENMO® transaction. In this example, card network 402 routes the single-use token "T1" back to VENMO®. In this way, the single-use token "T1" that was generated by token service provider 210 and stored at token requestor 208 is eventually returned to token service provider 210.

At an action 424, token service provider 210 receives the single-use token "T1" that it previously generated, and de-tokenizes the single-use token "T1." Token service provider 210 identifies transaction information in the single-use token by "de-tokenizing" it. The process of de-tokenizing a transactable token may include searching token vault 256 to identify the underlying funding instrument to charge for the transaction specific to the transactable token. In an example, the underlying funding instrument is an account the user has with the payment service provider. In this example, the underlying funding instrument may include one or more payment methods, and one or more of these payment methods within the funding instrument may be charged to complete the transaction.

Token service provider 210 generated the single-use token "T1" and thus has information about it. For example, token service provider 210 knows the transaction for which the single-use token was generated and the common ID corresponding to the single-use token "T1." Token service provider 206 maintains a database 425 that stores common IDs and funding instruments corresponding to tokens generated by the token service provider. In an example, token service provider 210 de-tokenizes the single-use token "T1" by identifying its corresponding common ID "CID1", and accordingly identifying the underlying funding instrument (e.g., the user's payment service provider account) corresponding to the common ID "CID1." In this example, "Acct1" corresponds to the common ID "CID1" and is a funding instrument of a "PSPAcct" type, which is an account provided by the payment service provider to the user.

As discussed, if the funding instrument to be charged is the user's account with the payment service provider, more information may be requested in order to charge the correct payment method within the funding instrument. In order for the appropriate payment method within the funding instrument to be charged, token service provider 210 sends transaction information to payment server 212. Process flow may proceed from action 424 to an action 430 in FIG. 4C, in which token service provider 210 sends a charge request to payment server 212. The charge request includes transaction information based on de-tokenizing the token. The charge request specifies the funding instrument "Acct1," transaction amount "$100," and merchant ID "Merch1," which identifies the merchant that provides merchant application 202. The charge request provides payment server 212 with information on which payment method within the funding instrument "Acct1" to charge and how much to charge in order to complete the transaction and pay the merchant as requested by the user. The transaction information included in the charge request may be sent to payment server 212 in a variety of ways. In an example, token service provider 210 invokes an API exposed by payment server 212 to cause the identified transaction information in the de-tokenized token to be sent to payment server 212.

At an action 432, payment server 212 selects a payment method within the funding instrument specified in the charge request to charge for the transaction. The payment method may be, for example, a credit card, debit card, checking account, etc., that is housed within the digital wallet (e.g., VENMO® account)/funding instrument. Payment server 212 maintains a payment database 433 including payment methods associated with the user's accounts. In payment database 433, a payment method "V-4567" is housed within the funding instrument "Acct1." It should be understood that this is merely an example, and other payment method(s) may be housed within the funding instrument. In this example, payment server 212 selects the payment method "V-4567," which is associated with "Acct1."

The funding instrument "Acct1" may be referred to as the payment source for the transaction, and a payment method within the funding instrument may be charged for the transaction. If the user has requested to pay with the user's payment service provider account, charging the funding instrument may refer to charging a payment method within the funding instrument. After the payment service provider selects the payment method within the funding instrument specified in the charge request, the payment service provider sends a charge request to issuing bank 404 to charge the selected payment method. Process flow may proceed from action 432 to an action 434 in FIG. 4D, in which payment server 212 sends a charge request specifying the customer's name "John Smith," Transaction Amount=$100," and selected "Payment Method=V-4567" to issuing bank 404. The charge request is a request to charge the payment method specified in the request. Issuing bank 404 is the entity that determines whether to authorize charges to the payment method. Issuing bank 404 may be the source of the payment method and may have provided the selected payment method to the user. In keeping with the above example, issuing bank 404 may be the credit company that provided the "V-4567" credit card to the user. If the selected payment method within the funding instrument is a debit card, issuing bank 404 may be the bank that provided the debit card to the user. If the selected payment method within the funding instrument is a checking account, issuing bank 404 may be the bank that provided the checking account to the user. If the selected payment method within the funding instrument is an account provided by the payment service provider, issuing bank 404 may be the payment service provider. In an example, the account within the funding instrument is a VENMO® account that has a monetary balance, and the user may increase this balance by depositing money into this account and decrease this balance by withdrawing from or charging against this account.

At an action 436, issuing bank 404 receives the charge request and determines whether to authorize the charge to the payment method specified in the charge request. Issuing bank 404 may check the balance of the payment method. In an example, issuing bank 404 determines the balance on credit card "V-4567" and whether charging the transaction amount on this credit card would cause the maximum spending limit on this credit card to be exceeded. In response to a determination that charging the transaction amount on the credit card would not cause the maximum spending limit to be exceeded, issuing bank 404 may approve the charge request. If issuing bank 404 approves the charge request, issuing bank 404 charges the payment method. In contrast, in response to a determination that charging the transaction amount on the credit card would cause the maximum spending limit to be exceeded, issuing bank 404 may reject the charge request. If issuing bank 404 rejects the charge request, issuing bank 404 does not charge the payment method.

Figure 4D:
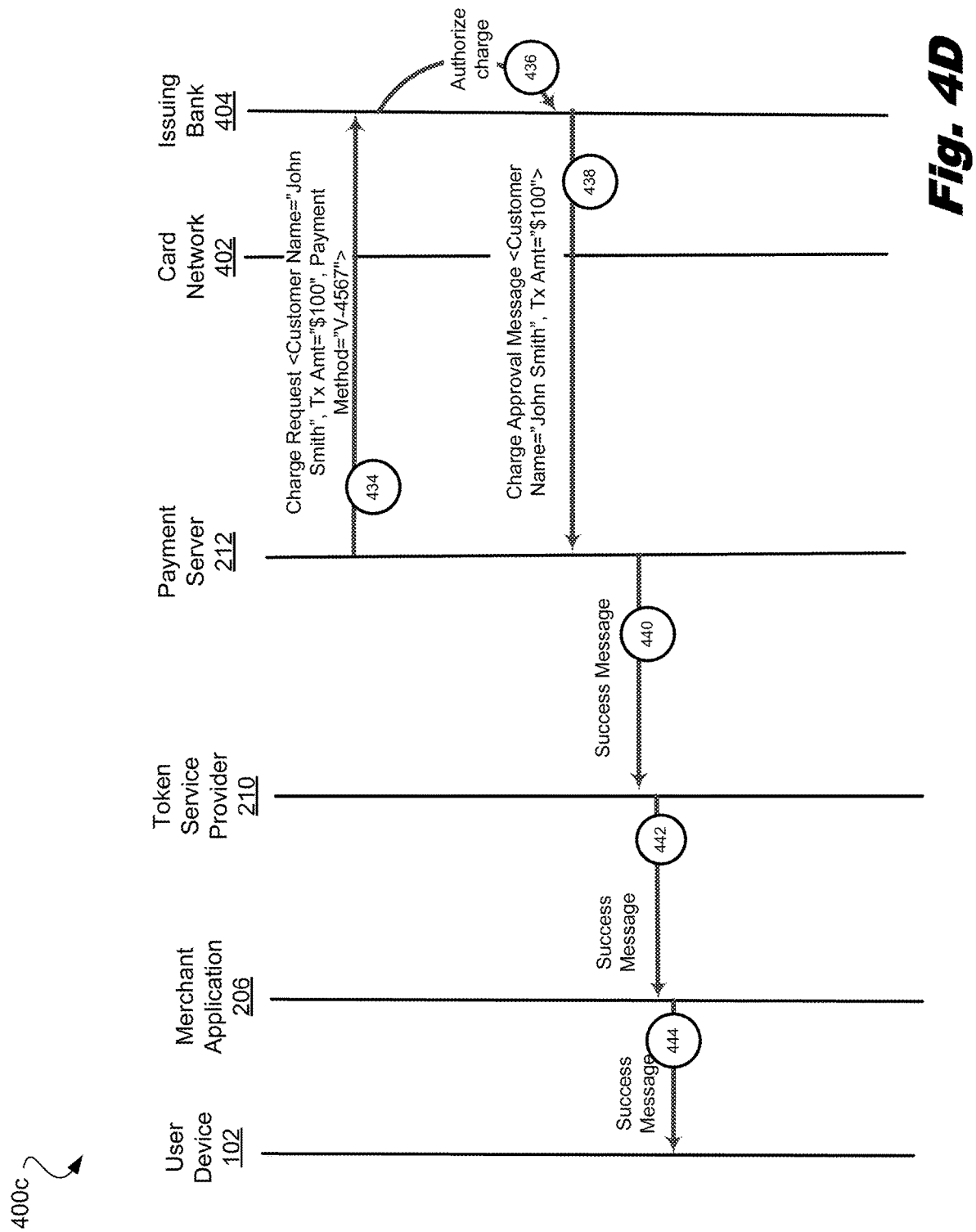

At an action 438, issuing bank 404 sends a message indicating approval or rejection of the charge request to payment server 212. Payment server 212 receives the message indicating approval or rejection of the charge request. In the example illustrated in FIG. 4D, issuing bank 404 approves the charge request and thus approves the charge to the payment method within the underlying funding instrument "Acct1." Accordingly, issuing bank 404 sends a charge approval message to payment server 212. The charge approval message includes transaction information including the customer name "John Smith" and transaction amount "$100."

If the charge to the payment method within the funding instrument was successful, process flow may proceed to an action 440, in which payment server 212 sends a success message to token service provider 206. At an action 442, token service provider 206 receives the success message and forwards it to merchant application 202. At an action 444, merchant application 202 receives the success message and forwards it to user device 102. In this way, the user may be informed of the success of the transaction.

In contrast, if issuing bank 404 rejects the charge request sent in action 434, issuing bank 404 does not charge the payment method specified in the charge request and may send a reject message to payment server 212, which sends the reject message to token service provider 206. Token service provider 206 forwards the reject message to merchant application 202, which forwards the reject message to user device 102. The reject message indicates to the user that the transaction was not approved. The user may try again to purchase goods or services from merchant application 206.

Figure 5:
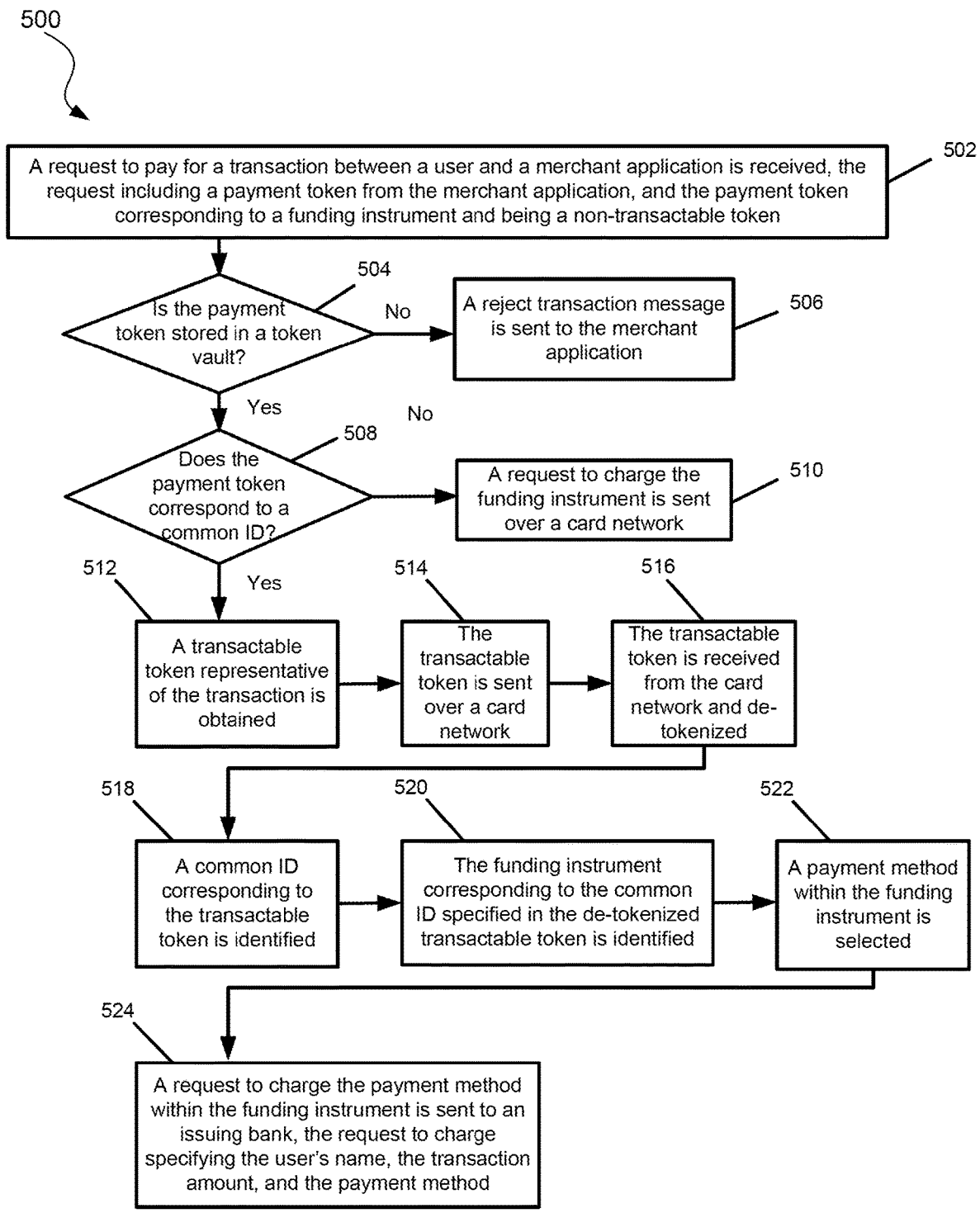
FIG. 5 is a flowchart illustrating an example method of charging a funding instrument associated with a payment token.

FIG. 5 is a flowchart illustrating an example method 500 of charging a funding instrument associated with a payment token. Method 500 is not meant to be limiting and may be used in other applications other than the payment applications discussed below. Method 500 includes steps 502-524.

At a step 502, a request to pay for a transaction between a user and a merchant application is received, the request including a payment token from the merchant application, and the payment token corresponding to a funding instrument and being a non-transactable token. In an example, payment application 202 receives a request to pay for a transaction between a user and merchant application 206, the request including the payment token "xyz" from merchant application 206, and the payment token "xyz" corresponding to a funding instrument "Acct1" and being a non-transactable token.

At a step 504, it is determined whether the payment token is stored in a token vault. In an example, token requestor 208 determines whether the payment token "xyz" is stored in token vault 256. If the payment token is not stored in the token vault, process flow may flow from step 504 to a step 506, in which a reject transaction message is sent to the merchant application. In an example, token requestor 208 sends the reject transaction message to merchant application 206. In contrast, if the payment token is stored in the token vault, process flow may flow from step 504 to a step 508, in which it is determined whether the payment token corresponds to a common ID. In an example, token requestor 208 determines whether the payment token "xyz" corresponds to a common ID stored in the token vault.

If the payment token does not correspond to a common ID, process flow may flow from step 508 to a step 510, in which a request to charge the funding instrument is sent over a card network. If the payment token corresponds to a common ID, process flow may flow from step 508 to a step 512, in which a transactable token representative of the transaction is obtained. In an example, token service provider 206 generates the transactable token "T1" that is representative of the transaction. If the payment token corresponds to a common ID, the funding instrument corresponding to the common ID includes one or more payment methods that can be charged for the transaction. The transactable token may be used to lead to the charging of the appropriate payment method.

In a step 514, the transactable token is sent over the card network. The card network may be, for example, a credit card network or any other network capable of processing accounts (e.g., card account or bank account) for payment. In an example, token requestor 208 sends the transactable token "T1" over card network 402. In a step 516, the transactable token is received from the card network and de-tokenized. In an example, token service provider 210 receives the transactable token "T1" from card network 402 and de-tokenizes the transactable token. In this example, token service provider 206 is the originator of the transactable token and eventually receives it back.

In a step 518, a common ID corresponding to the transactable token is identified. In an example, token service provider 206 identifies common ID "CID1" corresponding to the single-use token "T1." In a step 520, the funding instrument corresponding to the common ID specified in the de-tokenized transactable token is identified. In an example, token service provider 206 identifies the funding instrument "Acct1" corresponding to the common ID "CID1" specified in the de-tokenized transactable token "T1." In a step 522, a payment method within the funding instrument is selected. In an example, payment server 212 selects "V-4567" as the payment method, which is within the funding instrument "Acct1." In a step 524, a request to charge the payment method within the funding instrument is sent to an issuing bank, the charge request specifying the user's name, the transaction amount, and the payment method. In an example, payment server 212 sends a request to charge the payment method within the funding instrument to issuing bank 404, the charge request specifying the user's name "John Smith," the transaction amount "$100," and the payment method "V-4567." Issuing bank 404 may receive the charge request and decide whether or not to authorize charging of the payment method specified in the charge request.

It should be understood that additional processes may be performed before, during, or after steps 502-524 discussed above. It is also understood that one or more of the steps of method 500 described herein may be omitted, combined, or performed in a different sequence as desired.

The payment service provider may provide the user with transaction information from the merchant. For example, the payment service provider or the merchant may provide an invoice to the user. Information that prints on the invoice or receipt may be limited because this information is typically sent using the ISO-8583 standard. Messages sent to and from card network 402 may adhere to the ISO-8583 standard. Currently, the information about the merchant and the transaction that is available is passed in an ISO-8583 message at transaction time. An ISO-8583 message is limited in the amount of detail it provides. Also, the quality of the data sent in the ISO-8583 message depends on the acquirer who set up the merchant. If token requestor 208 and token service provider 210 are different entities, then these entities may have different details about the transactions. For example, the merchant may interact directly with token requestor 204 and provide it with additional information about the merchant. Accordingly, token requestor 208 may have additional details about transactions (which cannot be sent over the ISO-8583 standard) that are not known by token service provider 206 and that may add value to transactions.

Merchants may desire to provide more information to customers. For example, merchants may desire to present more branded information (e.g., by presenting their logo on receipts). Likewise, users may desire more information in their invoices or receipts from merchants. Unfortunately, the ISO-8583 message formats and the supporting networks do not support containers for rich datasets. If the user selects to pay with her payment service provider account, it may be desirable for the payment service provider to send supplemental transaction data to user device 102. This avoids the field limitations of some of the payment transaction rails discussed above.

The supplemental transaction data may be referred to as "supplemental" because this transaction data is not being sent in an ISO-8583 message. In particular, supplemental transaction data may include information that is not sent under the ISO-8583 standard. Supplemental transaction data may include various data. In an example, the transaction specific data includes multiple name-value pairs. In an example, supplemental transaction data includes an external merchant ID that is used to represent the merchant and/or an external transaction reference ID that is used as a unique ID to identify the transaction. The merchant ID and/or transaction reference ID may be retained and stored until the corresponding TPAN has been de-tokenized and the supplemental transaction data forwarded to the payment service provider, or until the TPAN expires. The merchant ID and/or transaction reference ID may be, for example, an alphanumeric 32-character ID. In another example, supplemental transaction data includes the merchant's logo, special deals offered by the merchant, and/or other information that cannot be easily transmitted using the conventional ISO-8583 standard.

The supplemental transaction data may be used for various purposes such as risk management, location-based services, customer notification, etc. For example, risk related information, which is information that helps the payment service provider determine a risk of authorizing the user to charge the funding instrument, location information, merchant or transaction related details or any information that size-wise is longer than is acceptable in the typical ISO-8583 field standards may be forwarded to the payment service provider. Additionally, merchant or transaction related details or any information that data format-wise is not acceptable in the typical ISO-8583 field standards may be forwarded to the payment service provider. In an example, sending data in a particular format (e.g., image in a GIF format) may not be acceptable in the typical ISO-8583 field standards. The supplemental transaction data may be specific to a merchant and information that is provided by the merchant to token requestor 208. The presence of the supplemental transaction data may leverage the information in the existing ISO-8583 standard and provide solutions to the shortcomings of the existing ISO-8583 specification. The supplemental transaction data may include a merchant ID and a handle to a particular transaction (e.g., transaction ID). The supplemental transaction data may originate from the merchant or token requestor that is in a business relationship with merchant application 202.

As will be explained in relation to FIGS. 6A-6E, the token service provider 210 and/or payment service provider may seek this information (e.g., the supplemental transaction data) on top of the information provided in an ISO-8583 message to enhance the transaction experience for the user and/or for reconciliation purposes. For example, during the de-tokenization and payment authorization, token service provider 210 and/or payment server 212 may use the supplemental transaction data to provide a richer experience to the user. FIGS. 6A-6E is an example process flow 600a, 600b, 600c, 600d, and 600e for providing supplemental transaction data to a user in relation to charging an underlying funding instrument to complete a transaction involving the user. Process flow 600a, 600b, 600c, 600d, and 600e show interactions between user device 102, merchant application 206, token requestor 208, token service provider 210, payment server 212, card network 402, and issuing bank 404 that lead to supplemental transaction data being sent to entities associated with the transaction.

Figure 6A:
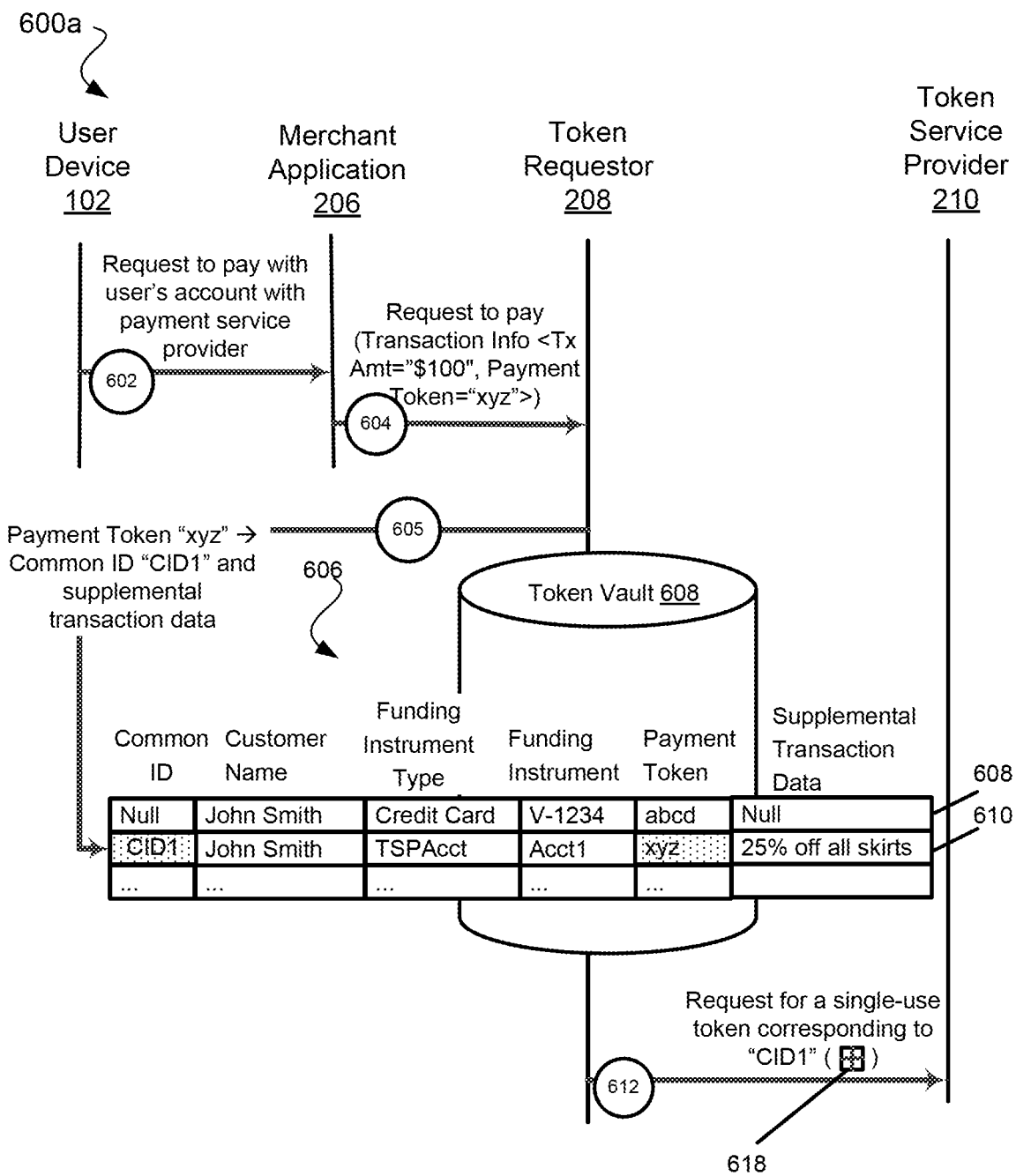
FIGS. 6A, 6B, 6C, 6D, and 6E is an example process flow for providing supplemental transaction data to a user in relation to charging an underlying funding instrument to complete a transaction.

FIG. 6A includes an action 602, in which user device 102 sends a request to pay with the payment service provider to merchant application 206. At an action 604, merchant application 206 receives the request and sends the request to pay along with the transaction information to token requestor 208. In FIG. 6A, the transaction information includes a transaction amount of "$100" and the payment token "xyz." As discussed above, merchant application 206 knows to send the payment token "xyz" to token requestor 208 because this payment token is associated with payments charged to the user's payment service provider account.

Additionally, merchant application 206 may provide information about itself to token requestor 208 for storing into token vault 608 (e.g., offers, store locations, the merchant's logo, etc.). It may be desirable to provide this contextual information to token service provider 210 or the payment service provider at the time it is authorizing the payment. It may be difficult to send this supplemental transaction data using the ISO-8583 standard message because this standard is limited and does not include these rich data set fields.

Token requestor 208 maintains token vault 608 and stores information associated with user accounts and their associated payment tokens, common IDs (if applicable), and supplemental transaction data (if applicable) into the token vault. Token vault 608 includes a user account table 606 having Common ID, Customer Name, Funding Instrument Type, Funding Instrument, Payment Token, and Supplemental Transaction Data columns. The supplemental transaction data is stored in the Supplemental Transaction Data column in user account table 606. Token requestor 208 may store a certain amount of transaction-contextual information into the Supplemental Transaction Data column of user account table 606. User account table 606 has the information stored in user account table 256 in FIG. 4A, but also includes a Supplemental Transaction Data column storing additional data that is specific to a merchant and/or transaction.

User account table 606 includes a first entry 608, which includes the information in entry 258 in FIG. 4A, and a Null value in the supplemental transaction data field. A second entry 610 includes the information in entry 260 in FIG. 4A, but also includes supplemental transaction data including special deals offered by the merchant (e.g., 25% off all skirts). It should be understood that the Supplemental Transaction Data column in user account table 606 is an example of how the supplemental transaction data is stored. In other examples, the supplemental transaction data information may be stored in a data structure separate from token vault 608 and referenced by the appropriate entry in token vault 608 if the entry is associated with supplemental transaction data.

At an action 605, token requestor 208 searches token vault 608 for an entry including the payment token "xyz" and determines whether the payment token corresponds to a common ID and/or to supplemental transaction data. In the example illustrated in FIG. 6A, the payment token "xyz" corresponds to the common ID "CID1" and the supplemental transaction data in entry 610. The supplemental transaction data associated with the payment token "xyz" indicates that the merchant is offering a sale on all skirts. This information may be of interest to the user, especially because the user is attempting to purchase some items from this merchant and may already have a good relationship with this merchant.

If the payment token corresponds to a common ID, the common ID corresponds to a funding instrument that houses one or more payment methods to charge for the payment transaction. In some examples, the funding instrument source may be VENMO®, and the funding instrument is the user's VENMO® account. Token requestor 208 may desire to gather more information to identify the appropriate payment method within the particular funding instrument to charge for the payment transaction. At an action 612, token requestor 208 sends a request for a transactable token corresponding to the common ID to token service provider 210. The request for the transactable token also includes the supplemental transaction data corresponding to the payment token "xyz." The supplemental transaction data is represented by a quad 618 and may also be referred to as supplemental transaction data 218. In an example, the request for the transactable token is a request for a single-use token that may be consumed once by the payment service provider and then exhausted.

Token service provider 210 receives the request for a transactable token corresponding to the common ID "CID1" and supplemental transaction data 618. Process flow may proceed from action 612 to an action 614 in FIG. 6B, in which token service provider 210 stores the supplemental transaction data 618 into a transaction database 616 maintained by token service provider 210. Transaction database 616 stores supplemental transaction data 618 specific to transactions and/or merchants, and supplemental transaction data 618 corresponds to the requested transaction at action 602 and the common ID "CID1." Accordingly, token service provider 210 has within its possession supplemental transaction data 618 that may enrich the information provided to the user regarding this transaction and/or this merchant.

At an action 620, responsive to the single-use token request, token service provider 210 generates a single-use token "T2" representative of the transaction at action 602 having a transaction amount of "$100" and corresponding to the common ID "CID1." The supplemental transaction data 618 is specific to the single-use token "T2." At an action 622, token service provider 210 sends a message including the single-use token "T2" to token requestor 208. At an action 624, token requestor 208 stores the single-use token "T2" into token vault 256. Accordingly, token requestor 208 knows that single-use token "T2" is associated with this transaction.

Token requestor 208 may push the transaction information associated with the payment request in action 602 to card network 402. In an example, card network 402 may be a credit card network, debit card network, automated clearing house (ACH), or other type of network that processes electronic financial transactions. At an action 626, token requestor 208 sends a routing message including the single-use token "T2" to card network 402 for routing to the token's originator. In an example, the routing message is sent using the ISO-8583 standard, which has specified fields.

Card network 402 receives the message and routes the transaction information in accordance with the account type. For example, card network 402 may identify the source of the single-use token "T2," and route the transaction information accordingly. Process flow may proceed from action 626 to an action 628 in FIG. 6C, in which card network 402 identifies the routing details associated with the single-use token "T2." At an action 630, card network 402 routes the single-use token "T2" back to token service provider 210, the originator of the single-use token "T2." Card network 402 may send the single-use token "T2" to token service provider 210 using the ISO-8583 standard.

At an action 632, token service provider 210 receives the single-use token "T2" that it previously generated, and de-tokenizes the single-use token "T2." As discussed, token service provider 206 maintains database 425 that stores common IDs and funding instruments corresponding to tokens generated by the token service provider. Token service provider 210 may de-tokenize the single-use token "T2" by identifying its corresponding common ID "CID1", and accordingly identifying the underlying funding instrument (e.g., the user's payment service provider account) corresponding to the common ID "CID1." In this example, "Acct1" corresponds to the common ID "CID1" and is a funding instrument of a "PSPAcct" type, which is an account provided by the payment service provider to the user. Additionally, at an action 634, token service provider 206 identifies the supplemental transaction data 618 that is associated with the single-use token "T2." Token service provider 206 stored supplemental transaction data 618 in transaction database 616 at action 614 (see FIG. 6B).

The funding instrument includes one or more payment methods. In order for the appropriate payment method within the funding instrument to be charged, token service provider 210 sends transaction information to payment server 212. Process flow may proceed from action 634 to an action 636 in FIG. 4D, in which token service provider 210 sends a charge request to payment server 212. The charge request includes transaction information based on de-tokenizing the single-use token "T2." The charge request specifies the funding instrument "Acct1," transaction amount "$100," at least some of supplemental transaction data 218, and merchant ID "Merch1," which identifies the merchant that provides merchant application 202. In this example, token service provider 206 sends quad 618 (e.g., the skirt data) to payment server 212.

Regarding action 636, the present disclosure provides various techniques to send at least some or all of supplemental transaction data 218 to payment server 212 for storing in a database 642. In some examples, token service provider 206 does not send the supplemental transaction data to payment server 212 using the ISO-8583 standard. In the example illustrated in FIGS. 6B-6D, token service provider 210 stores supplemental transaction data 218 and forwards it to payment server 212. In some examples, token service provider 210 stores the supplemental transaction data 218 with a unique ID associated with the TPAN. At a later point in time, when token service provider 210 receives a transactable token from card network 402, token service provider 210 de-tokenizes the TPAN and identifies the underlying funding instrument to be a VENMO® account (e.g., VENMO® wallet). If the unique ID associated with the TPAN has supplemental transaction data associated with it, at least some of the supplemental transaction data is forwarded to payment server 212 along with the transaction information for payment authorization. This particular implementation may have advantages because it involves few components and therefore may eliminate potential points of failure. Additionally, the risk of payment server 212 receiving the supplemental transaction data and transaction data out of sequence is low. Moreover, the risk of data being lost in transit may be low because both transaction and supplemental transaction data are being sent in the same call. Furthermore, this integration of data between token requestor 208 and token service provider 210 may scale well across clients because a client makes one call to one party, and custom integrations may be unnecessary for each pair of token requestor 208 and token service provider 210.

Other techniques for providing supplemental transaction data 218 to payment server 212 are also within the scope of the present disclosure. In another example, token requestor 208 transmits supplemental transaction data 218 to payment server 212 directly. In this example, token requestor 208 and payment server 212 may decide on a secure mode of communication between them. Token requestor 208 may request a transactable token from token service provider 210, which returns single-use token "T2" with a unique ID to token requestor 208. Token requestor 208 sends supplemental transaction data 218 to payment server 212 along with the unique ID, and payment server 212 stores the supplemental transaction data 218. In response to receiving the single-use token from card network 402, token service provider 210 de-tokenizes the TPAN associated with the single-use token and identifies the underlying funding instrument.

In another example, token service provider 210 publishes an event to provide supplemental transaction data 218 to payment server 212. In this example, token requestor 208 may request a transactable token from token service provider 210 and include the supplemental transaction data 218 in the request. Token service provider 210 may generate the single-use token "T2" and return it to token requestor 208. Additionally, token service provider 210 publishes a notification that includes the supplemental transaction data 218 and a corresponding unique ID. Payment server 212 receives the notification and stores the supplemental transaction data 218 and the unique ID. In response to receiving the single-use token from card network 402, token service provider 210 de-tokenizes the TPAN associated with the single-use token and identifies the underlying funding instrument.

In another example, token service provider 210 passes supplemental transaction data 218 to payment server 212. In this example, token requestor 208 requests a transactable token from token service provider 210 and includes supplemental transaction data 218 in the request. Token service provider 210 may generate the single-use token and return it along with a unique ID to token requestor 208. Token service provider 210 may simultaneously pass supplemental transaction data 218 to a switch module that calls an API exposed by payment server 212. This API call may include parameters such as supplemental transaction data 218 and the unique ID. Payment server 212 may receive and store supplemental transaction data 218 and the unique ID.

In these examples, if the funding instrument is an account provided by the payment service provider (e.g., VENMO® wallet), token service provider 210 passes the transaction information along to the payment service provider. Token service provider 210 may invoke an API call exposed by the payment service provider that causes the transaction information to be passed to the payment service provider. In the same API call, the token service provider 210 may also send the unique ID to the payment service provider. The payment service provider may correlate supplemental transaction data 218 with the transaction using the unique ID. In this way, supplemental transaction data 218 may be put to use by the payment service provider.

At an action 638, payment server 212 selects a payment method within the funding instrument to charge for the transaction. Payment server 212 maintains payment database 433 including payment methods associated with the user's accounts. In this example, payment server 212 selects the payment method "V-4567," which is a payment method within the funding instrument "Acct1." Additionally, at action 640, payment server 212 stores supplemental transaction data 218 into a database 642. Payment server 212 may share some or all of supplemental transaction data 218 with the user to provide the user with more information about the merchant or particular transaction. Payment server 212 uses this supplemental transaction data to send additional data to the user.

Figure 6B:
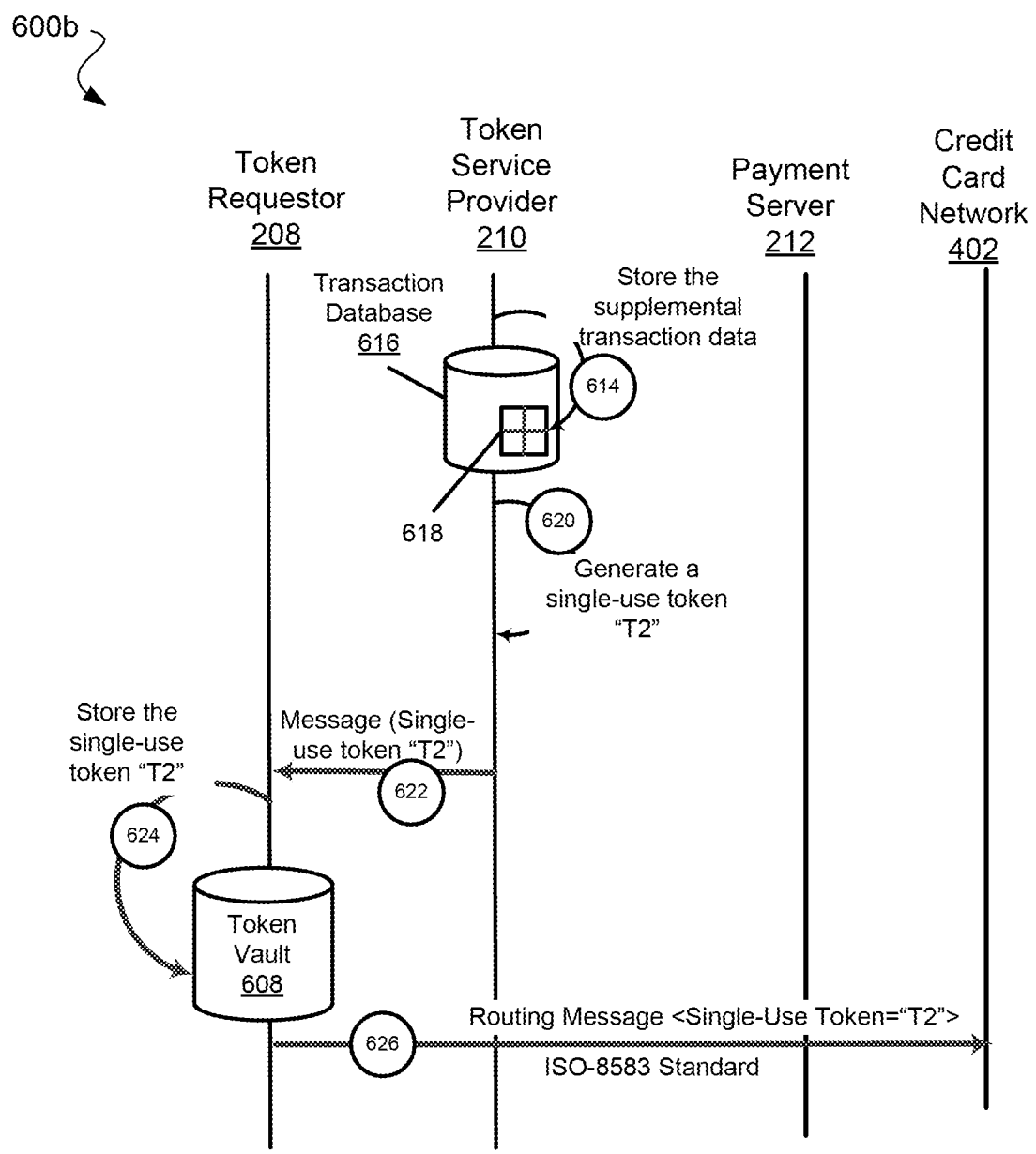
Figure 6C:
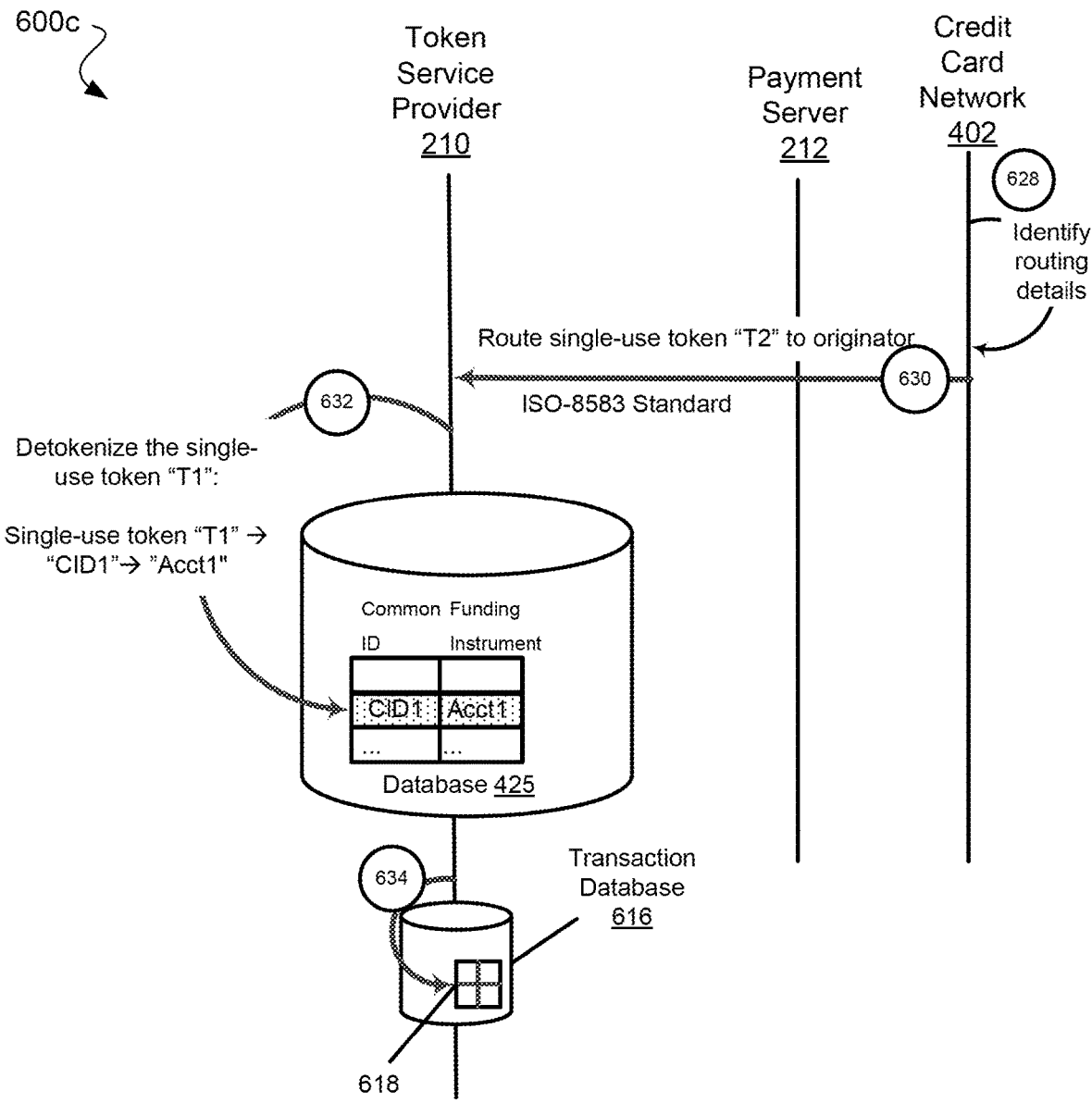
Figure 6D:
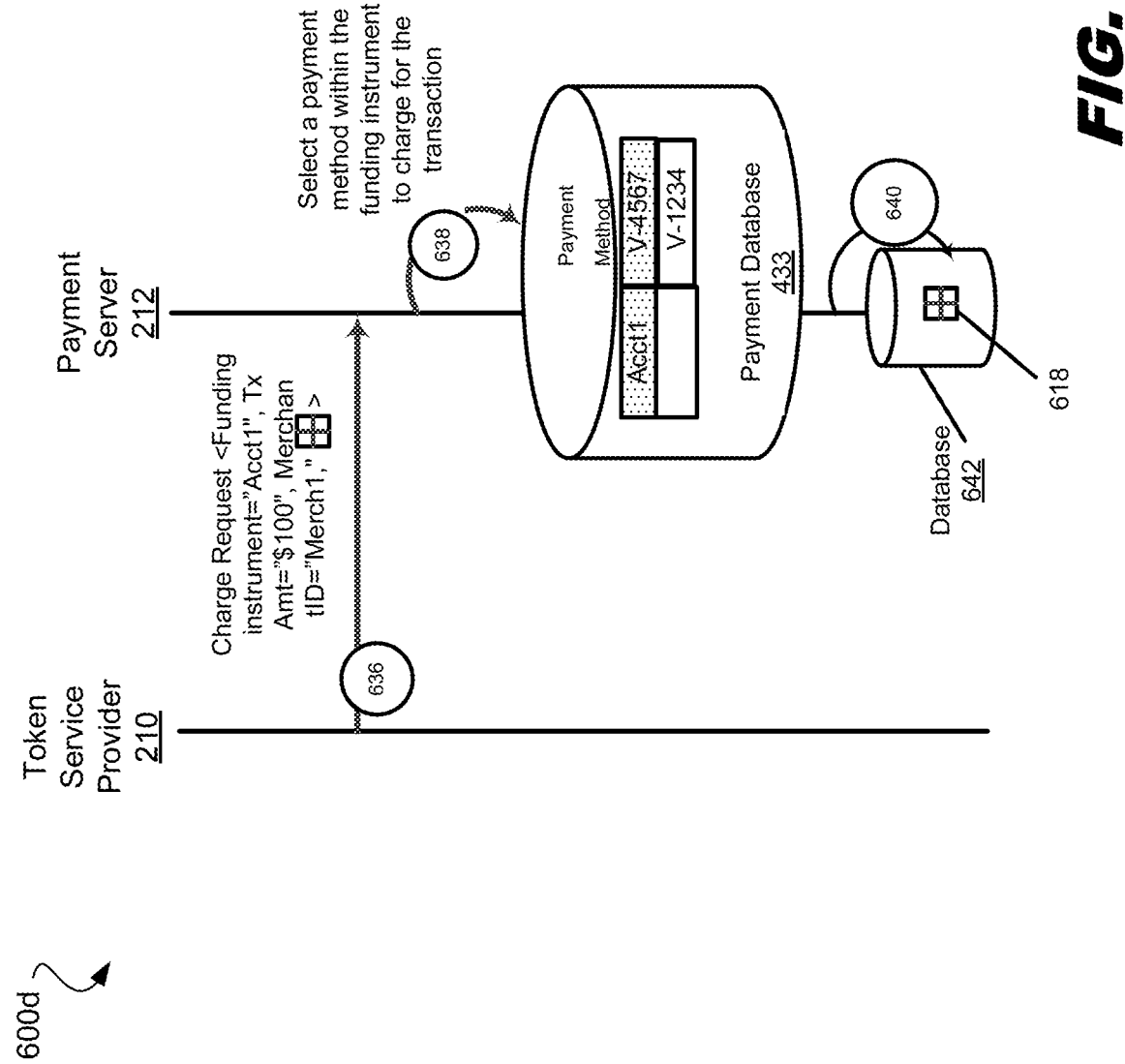
Figure 6E:
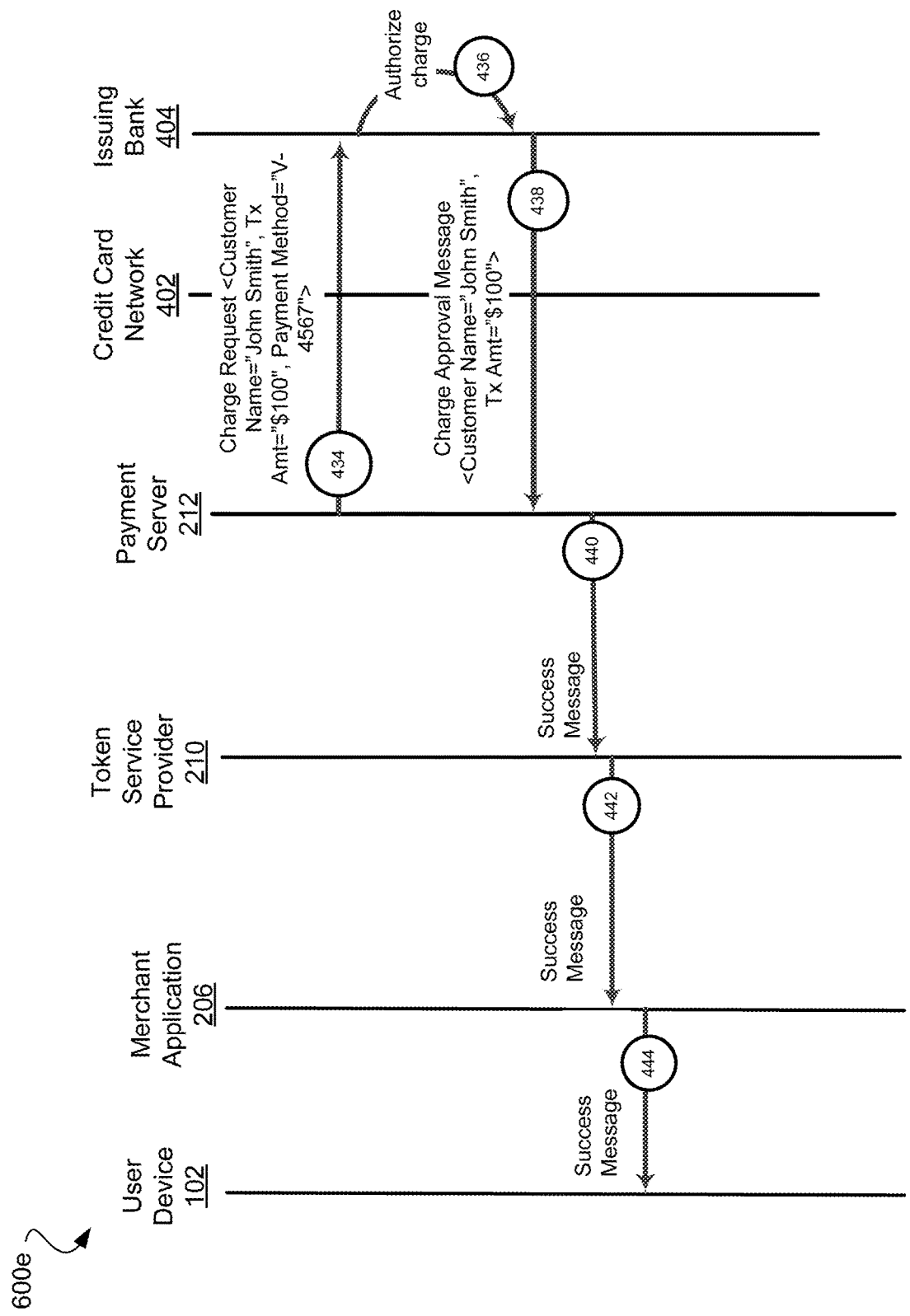

Process flow may proceed from action 640 to action 434 in FIG. 6E, in which payment server 212 sends a charge request specifying the customer's name "John Smith," Transaction Amount=$100," and selected "Payment Method=V-4567" to issuing bank 404. Process flow may then proceed from action 434 to actions 436, 438, 440, 442, and/or 444 which are similar to actions 436, 438, 440, 442, and/or 444 in FIG. 4D.

Payment server 212 may generate a receipt for the user and include in the receipt the de-tokenized information that was retrieved from single-use token "T2" along with at least some of supplemental transaction data 218, which token service provider 206 stored in transaction database 616 at action 614 (see FIG. 6B). For example, payment server 212 may display the merchant's sale "25% off all skirts" on the receipt to provide the user with more information about the merchant. This is not intended to be limiting, and payment server 212 may include other supplemental transaction data on the receipt or invoice sent to the user. In another example, supplemental transaction data 218 includes the merchant's logo, and payment server 212 displays the merchant's logo on the receipt or invoice.

It should be understood that in some examples, even if the payment token does not correspond to a common ID, the payment token may correspond to supplemental transaction data. In this example, the supplemental transaction data may be provided to user device 102 without performing the actions using the common ID.

Figure 7:
FIG. 7 is an example screenshot of supplemental transaction data displayed on a user device.

FIG. 7 is an example screenshot 700 of supplemental transaction data 218 displayed on user device 102. Screenshot 700 displays the items purchased by the user and supplemental transaction data 218 that was sent to and stored by the payment service provider. Screenshot 700 displays the merchant's icon 704 along with benefits 706 offered by the merchant. This information was not provided in an ISO-8583 message, but rather was provided to the payment service provider as discussed above in relation to FIGS. 6A-6E.

Unless specifically stated otherwise, as apparent from the following discussion, it is appreciated that throughout the description, discussions utilizing terms such as "receiving", "sending", "storing", "providing", "determining", "generating," "binding," "receiving," "authenticating," "rejecting," "searching," "obtaining," "routing," "de-tokenizing," "identifying," "charging," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

Figure 8:
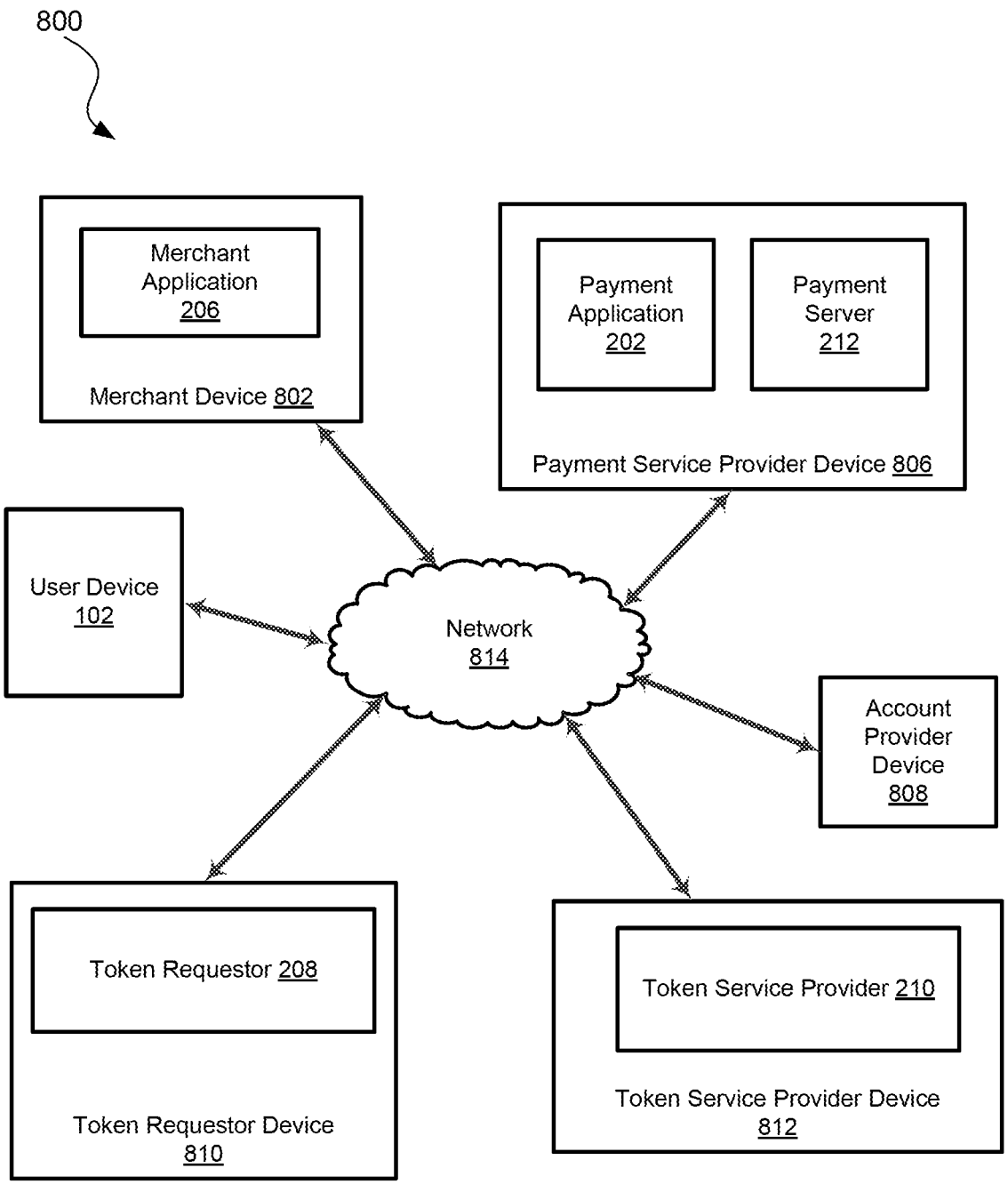
FIG. 8 is an embodiment of a network-based system for implementing one or more processes.

Referring now to FIG. 8, an embodiment of a network-based system 800 for implementing one or more processes described herein is illustrated. As shown, network-based system 800 may include or implement a plurality of servers and/or software components that operate to perform various methodologies in accordance with the described embodiments. Example servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 8 may be deployed in other ways and that the operations performed and/or the services provided by such servers may be combined or separated for a given implementation and may be performed by a greater number or fewer number of servers. One or more servers may be operated and/or maintained by the same or different entities.

The embodiment of networked system 800 illustrated in FIG. 8 includes one or more user devices 102, one or more merchant devices 802, one or more payment service provider devices 806, one or more account provider devices 808, one or more token requestor devices 810, and/or one or more token service provider devices 812 in communication over a network 814. Any of the user devices 102 may be the user devices, discussed above, and may be operated by the users discussed above. Merchant devices 802 may be the merchant devices discussed above and may be operated by the merchants discussed above. Merchant device 802 may store merchant application 206. Payment service provider devices 806 may be operated by the payment service provider described above. Payment service provider device 806 may store payment application 202 and/or payment server 212.

Account provider devices 808 may be the account provider devices discussed above and may be operated by the payment service provider discussed above. Account provider device may provide the user with an account with the payment service provider. Token requestor device 810 may be a device that provides token requestor 208 discussed above, and provides these services to other entities. Token requestor device 810 may be operated by, for example, BRAINTREE®. Additionally, token service provider device 812 may be a device that provides token service provider 210 discussed above, and provides these services to other entities. Token service provider 210 may be operated by, for example, VENMO®.

The one or more user devices 102, one or more merchant devices 802, one or more payment service provider devices 806, one or more account provider devices 808, one or more token requestor devices 810, and/or one or more token service provider devices 812 may each include one or more processors, memories, and other appropriate components for executing instructions such as program code and/or data stored on one or more computer readable mediums to implement the various applications, data, and steps described herein. For example, such instructions may be stored in one or more computer readable mediums such as memories or data storage devices internal and/or external to various components of the system 800, and/or accessible over the network 814.

The network 814 may be implemented as a single network or a combination of multiple networks. For example, in various embodiments, the network 814 may include the Internet and/or one or more intranets, landline networks, wireless networks, and/or other appropriate types of networks.

The user devices 102 may be implemented using any appropriate combination of hardware and/or software configured for wired and/or wireless communication over network 814. For example, in one embodiment, the user devices 102 may be implemented as a personal computer of a user in communication with the Internet. In other embodiments, the user devices 802 may be a smart phone, personal digital assistant (PDA), laptop computer, and/or other types of computing devices. The user devices 102 may include one or more browser applications which may be used, for example, to provide a convenient interface to permit the user to browse information available over the network 814. For example, in one embodiment, the browser application may be implemented as a web browser configured to view information available over the Internet. The browser may display page 100 in FIG. 1. The user devices 102 may also include one or more toolbar applications which may be used, for example, to provide user-side processing for performing desired tasks in response to operations selected by the user. In one embodiment, the toolbar application may display a user interface in connection with the browser application.

The user devices 102 may further include other applications as may be desired in particular embodiments to provide desired features to user devices 102. In particular, the other applications may include a payment application for payments assisted by a payment service provider through the payment service provider device 806. The other applications may also include security applications for implementing user-side security features, programmatic user applications for interfacing with appropriate application programming interfaces (APIs) over the network 814, or other types of applications. Email and/or text applications may also be included, which allow the user to send and receive emails and/or text messages through the network 814. The user devices 102 may include one or more user and/or device IDs which may be implemented, for example, as OS registry entries, cookies associated with the browser application, IDs associated with hardware of the user devices 102, or other appropriate IDs, such as a phone number. In one embodiment, the user ID may be used by the payment service provider device 806 and/or account provider devices 808 to associate the user with a particular account as further described herein.

The merchant devices 802 may be maintained, for example, by a conventional or on-line merchant, conventional or digital goods seller, individual seller, and/or application developer offering various products and/or services in exchange for payment to be received conventionally or over the network 814. In this regard, the merchant devices 802 may include a database identifying available products and/or services (e.g., collectively referred to as items) which may be made available for viewing and purchase by the user. The merchant devices 802 may also include a checkout application which may be configured to facilitate the purchase by the payer of items. The checkout application may be configured to accept payment information from the user through the user devices 102, the account providers through the account provider devices 808, and/or from the payment service provider through the payment service provider device 806 over the network 814.

Figure 9:
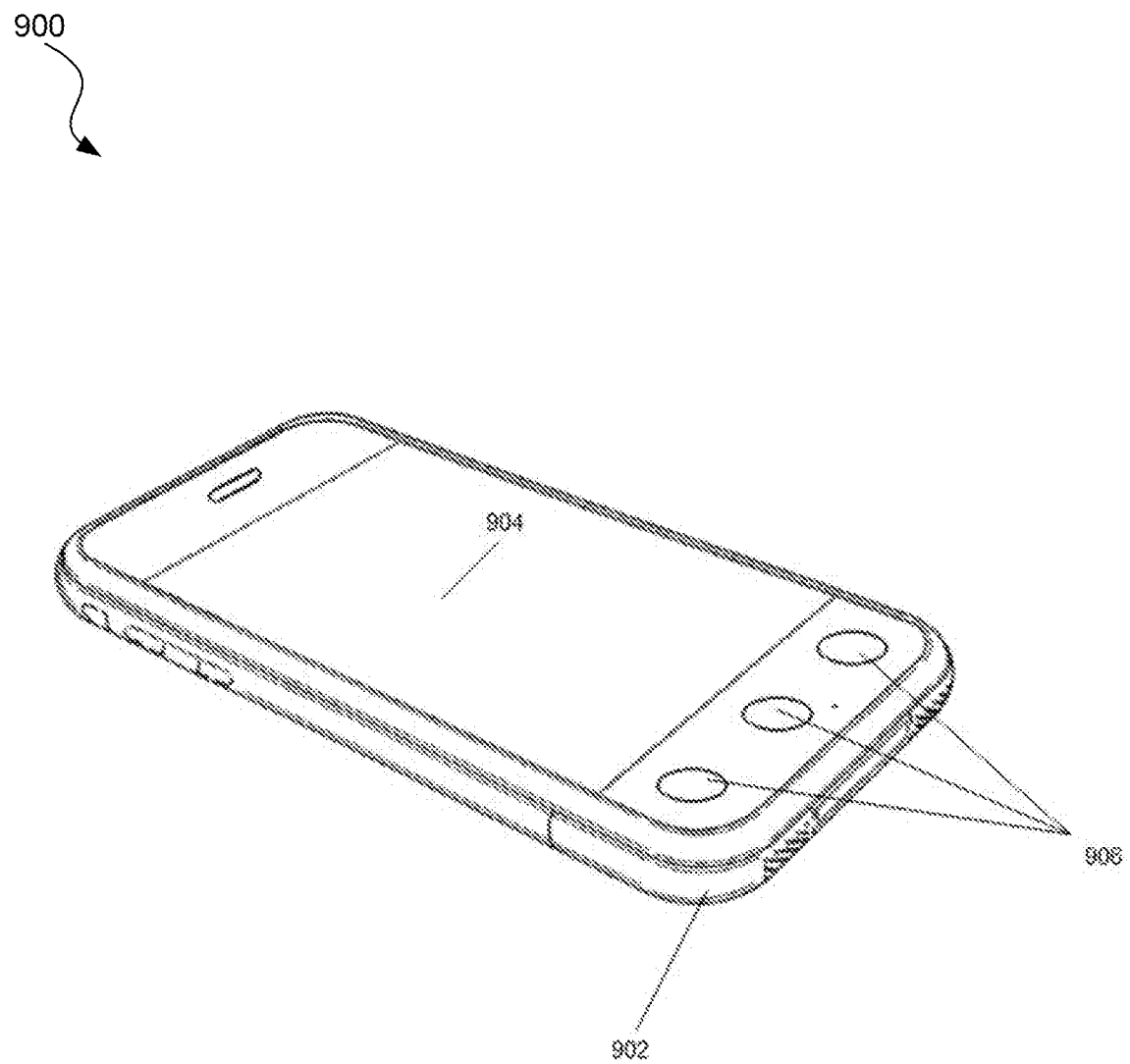
FIG. 9 is a schematic view illustrating an embodiment of a networked system.

Referring now to FIG. 9, an embodiment of a user device 900 is illustrated. The user device 900 may be any of the user devices discussed above. The user device 900 includes a chassis 902 having a display 904 and an input device including the display 904 and a plurality of input buttons 906. One of skill in the art will recognize that the user device 900 is a portable or mobile phone including a touch screen input device and a plurality of input buttons that allow the functionality discussed above with reference to the methods 300 and/or 500. However, a variety of other portable/mobile user devices and/or desktop user devices may be used in the methods discussed above without departing from the scope of the present disclosure.

Figure 10:
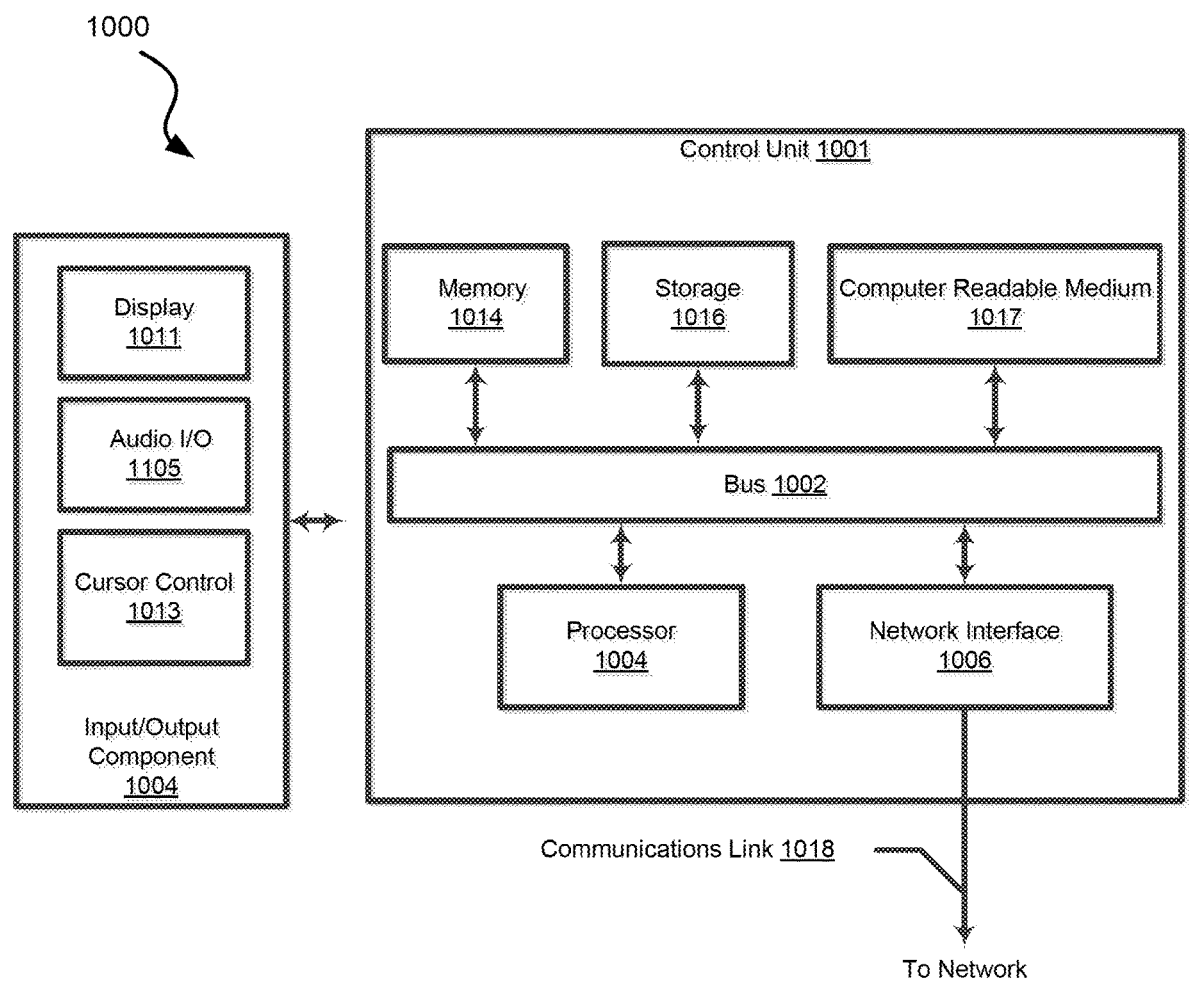
FIG. 10 is a perspective view illustrating an embodiment of a user device.

FIG. 10 is a block diagram of a computer system 1000 suitable for implementing one or more embodiments of the present disclosure. In various implementations, merchant device 802, payment service provider device 806, account provider device 808, token requestor device 810, and/or token service provider device 812 may be a client or a server computing device. The client or server computing device may include one or more processors. The client or server computing device may additionally include one or more storage devices each selected from a group including a floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read. The one or more storage devices may include stored information that may be made available to one or more computing devices and/or computer programs (e.g., clients) coupled to the client or server using a computer network (not shown). The computer network may be any type of network including a LAN, a WAN, an intranet, the Internet, a cloud, and/or any combination of networks thereof that is capable of interconnecting computing devices and/or computer programs in the system.

Computer system 1000 includes a bus 1002 or other communication mechanism for communicating information data, signals, and information between various components of computer system 1000. Components include an input/output (I/O) component 1004 that processes a user action, such as selecting keys from a keypad/keyboard, selecting one or more buttons or links, etc., and sends a corresponding signal to bus 1002. I/O component 1004 may also include an output component such as a display 1011, and an input control such as a cursor control 1013 (such as a keyboard, keypad, mouse, etc.). In an example, page 100 may be displayed on display 1011. An audio input/output component 1005 may also be included to allow a user to use voice for inputting information by converting audio signals into information signals. Audio I/O component 1005 may allow the user to hear audio.

A transceiver or network interface 1006 transmits and receives signals between computer system 1000 and other devices via a communications link 1018 to a network. In an embodiment, the transmission is wireless, although other transmission mediums and methods may also be suitable. A processor 1004, which may be a micro-controller, digital signal processor (DSP), or other processing component, processes these various signals, such as for display on computer system 1000 or transmission to other devices via communications link 1018. Processor 1004 may also control transmission of information, such as cookies or IP addresses, to other devices.

Components of computer system 1000 also include a system memory component 1014 (e.g., RAM), a static storage component 1016 (e.g., ROM), and/or a disk drive 1017. Computer system 1000 performs specific operations by processor 1004 and other components by executing one or more sequences of instructions contained in system memory component 1014. Logic may be encoded in a computer readable medium, which may refer to any medium that participates in providing instructions to processor 1004 for execution. Such a medium may take many forms, including but not limited to, non-volatile media, volatile media, and transmission media. In various implementations, non-volatile media includes optical, or magnetic disks, or solid-state drives, volatile media includes dynamic memory, such as system memory component 1014, and transmission media includes coaxial cables, copper wire, and fiber optics, including wires that include bus 1002. In an embodiment, the logic is encoded in non-transitory computer readable medium. In an example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences (e.g., process flows 200, 400, and/or 600 and/or methods 300 and/or 500) to practice the present disclosure may be performed by computer system 1000. In various other embodiments of the present disclosure, a plurality of computer systems 1000 coupled by communications link 1018 to the network (e.g., such as a LAN, WLAN, PTSN, and/or various other wired or wireless networks, including telecommunications, mobile, and cellular phone networks) may perform instruction sequences to practice the present disclosure in coordination with one another.

Figure 11:
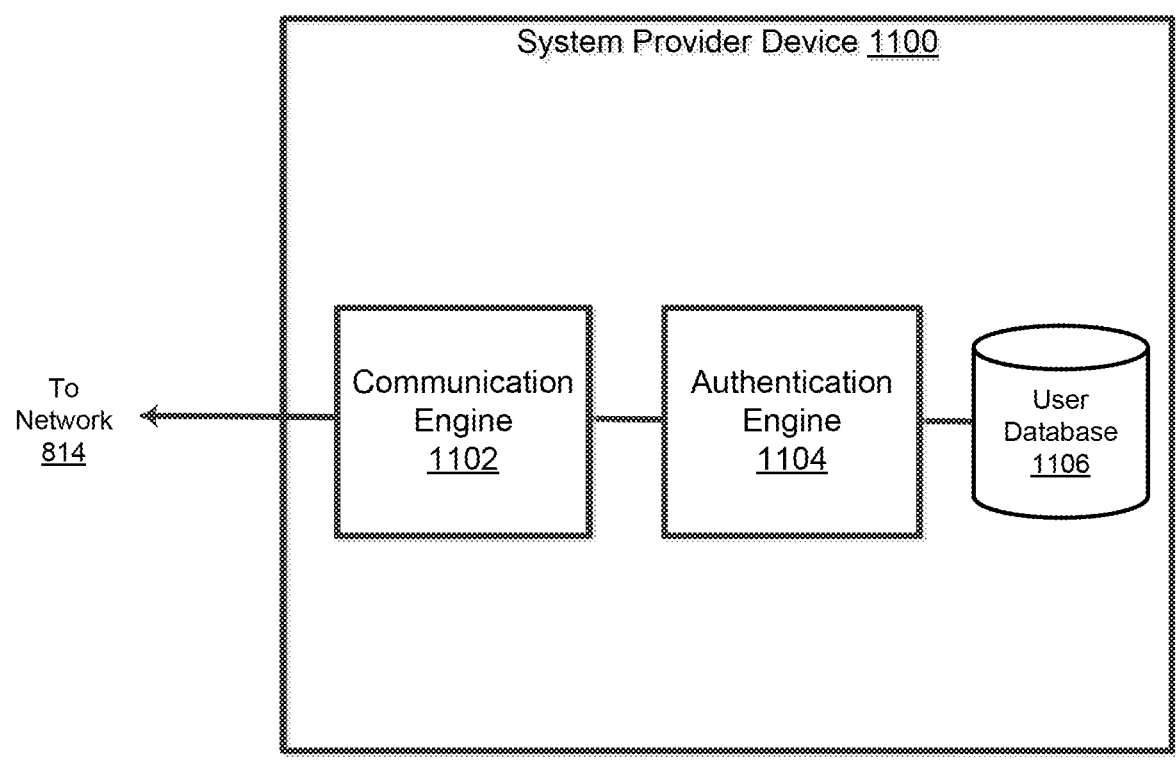
FIG. 11 is a schematic view illustrating an embodiment of a computer system.

Referring now to FIG. 11, an embodiment of a system provider device 1100 is illustrated. In an embodiment, the device 1100 may be the user devices, the merchant devices, the payment service provider device, the account provider devices, token requestor devices, and/or the token service provider device discussed above. The device 1100 includes a communication engine 1102 that is coupled to the network 814 and to an authentication engine 1104 that is coupled to a user database 1106. The communication engine 1102 may be software or instructions stored on a computer-readable medium that allows the device 1100 to send and receive information over the network 814. The authentication engine 1104 may be software or instructions stored on a computer-readable medium that is operable to provide any of the other functionality that is discussed above. While the database 1106 has been illustrated as located in the device 1100, one of skill in the art will recognize that it may be connected to authentication engine 1104 through the network 814 without departing from the scope of the present disclosure.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on payees and payers; however, a payer or consumer can pay, or otherwise interact with any type of recipient, including charities and individuals. The payment does not have to involve a purchase, but may be a loan, a charitable contribution, a gift, etc. Thus, payee as used herein can also include charities, individuals, and any other entity or person receiving a payment from a payer. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system for binding non-transactable tokens to a user's account with a payment service provider, comprising:
   a non-transitory memory; and
   one or more hardware processors coupled to the non-transitory memory and configured to read instructions from the non-transitory memory to cause the system to perform operations comprising:
      receiving, via a token requestor that is provided by the system, a first request to pay for a transaction using the user's account with the payment service provider that is provided by the system, the first request specifying a funding instrument that is a payment source for the transaction, the payment service provider being a source of the funding instrument, and the transaction being between a user and a merchant application;

receiving, by the token requestor provided from a token service provider that is provided by the system, a common identifier (ID) corresponding to the funding instrument, the common ID being a first non-transactable token and associated with the merchant application and the user;

generating, by the token requestor, a payment token corresponding to the common ID and the funding instrument, the payment token being a second non-transactable token that maps to the common ID;

binding, by the token requestor, the user's account to the payment token and the common ID;

receiving, by the token requestor, a second request to pay for a second transaction between the user and the merchant application, the second request including a second payment token and transaction information, wherein the transaction information includes a first portion of the transaction information that is acceptable in a routing message field standard of a routing message standard used by a card network routing message, and wherein a second portion of the transaction information includes supplemental transaction data associated with the merchant application and that cannot be provided in a card network routing message that uses the routing message standard due to the supplemental transaction data not being acceptable in the routing message field standard;

determining, by the token requestor, whether the second payment token corresponds to the common ID stored in a token vault;

in response to a determination that the second payment token corresponds to the common ID, providing, by the token requestor to the token service provider, a request for a transactable token corresponding to the common ID;

receiving, by the token requestor from the token service provider, the transactable token and a unique ID;

directly transmitting, by the token requestor, the supplemental transaction data and the unique ID to the payment service provider, wherein the unique ID is used by the payment service provider to correlate the supplemental transaction data with any subsequent transaction information received that is associated with the unique ID; and sending, by the token requestor to the card network, a card network routing message that uses the routing message standard and that includes at least some of the first portion transaction information and the transactable token, wherein upon receiving the transactable token from the card network by the token service provider, the operations further comprise:

de-tokenizing, by the token service provider, the transactable token to identify the funding instrument;

determining, by the token service provider, that the funding instrument is an account provided by the payment service provider; and sending, by the token service provider, the at least some of the first portion transaction information and the unique ID to the payment service provider;

correlating, by the payment service provider, using the unique ID, the supplemental transaction data with the at least some of the first portion transaction information received that is associated with the unique ID;

completing the second transaction with the card network using only the at least some of the first portion transaction information presented in the routing message standard; and providing the at least some of the supplemental transaction data to a user device associated with the user along with information associated with a completion of the second transaction with the card network.

2. The system of claim 1, wherein the operations further comprise:

sending the payment token and a user's name to the merchant application.

3. The system of claim 2, wherein the operations further comprise:

sending, by a payment application provided by the payment service provider, a login request to the user in response to receiving the request from the merchant application;

receiving, by the payment application, a user's login information including a user's account ID and the user's name, the user's account ID corresponding to the funding instrument;

determining, by the payment application, whether the login information is stored in an entry in an account database, the account database storing account information of authenticated users; and in response to a determination that the login information is stored in the entry in the account database, authenticating the user, or in response to a determination that the login information is not stored in the account database, rejecting the login request.

4. The system of claim 1, wherein the operations further comprise:

identifying, by the token service provider, based on de-tokenizing the transactable token, the common ID;

identifying, by the token service provider, the funding instrument corresponding to the common ID;

selecting, by the payment service provider, a payment method within the funding instrument to charge for the transaction;

sending, by the payment service provider, a charge request including a set of parameters to an issuing bank that approves or rejects charges to the payment method, the set of parameters including the payment method, a user's name, and an amount of the transaction; and receiving, by the payment service provider, a charge response from the issuing bank, the charge response specifying an approval or rejection of the charge to the payment method.

5. The system of claim 1, wherein the operations further comprise:

searching, by the token requestor, the token vault for the second payment token, the token vault storing information associated with one or more user accounts.

6. The system of claim 1, wherein the payment service provider completes the second transaction with the card network using only the at least some of the first portion transaction information by:

selecting a payment method within the funding instrument to charge for the second transaction;

sending a charge request including a set of parameters to an issuing bank that approves or rejects charges to the payment method, the set of parameters including the payment method, a user's name, and an amount of the second transaction; and receiving a charge response from the issuing bank, the charge response specifying an approval or rejection of the charge to the payment method.

7. The system of claim 1, wherein the operations further comprise:

in response to a determination that the second payment token is stored in the token vault, determining, by the token requestor, whether the second payment token corresponds to the supplemental transaction data, wherein if the second payment token corresponds to the supplemental transaction data, the transactable token corresponds to the supplemental transaction data.

8. The system of claim 7, wherein the operations further comprise:

storing, by the token requestor, the supplemental transaction data into the token vault.

9. A method of binding non-transactable tokens to a user's account with a payment service provider device, comprising:

receiving, by a token requestor device, a request to pay for a transaction using the user's account with the payment service provider device, the request specifying a funding instrument that is a payment source for the transaction, the payment service provider device being a source of the funding instrument, and the transaction being between a user device and a merchant application;

receiving, by the token requestor device from the token service provider device, a common identifier (ID) corresponding to the funding instrument, the common ID being a first non-transactable token and associated with the merchant application and the user;

generating, by the token requestor device, a payment token corresponding to the common ID and the funding instrument, the payment token being a second non-transactable token that maps to the common ID;

binding, by the token requestor device, the user's account to the payment token and the common ID;

receiving, by the token requestor device, a second request to pay for a second transaction between the user and the merchant application, the second request including a second payment token and transaction information, wherein the transaction information includes a first portion of the transaction information that is acceptable in a routing message field standard of a routing message standard used by a card network routing message, and wherein a second portion of the transaction information includes supplemental transaction data associated with the merchant application and that cannot be provided in a card network routing message that uses the routing message standard due to the supplemental transaction data not being acceptable in the routing message field standard;

determining, by the token requestor device, whether the second payment token corresponds to the common ID;

in response to a determination that the second payment token corresponds to the common ID, providing, by the token requestor device to the token service provider device, a request for a transactable token corresponding to the common ID, wherein the request includes the supplemental transaction data;

receiving, by the token requestor device from the token service provider device, the transactable token;

sending, by the token requestor device to the card network, a card network routing message that uses the routing message standard and that includes at least some of the first portion transaction information, and the transactable token;

receiving, by the token service provider device, the transactable token from the card network;

de-tokenizing, by the token service provider device, the transactable token to identify the funding instrument;

determining, by the token service provider device, that the funding instrument is an account provided by the payment service provider device;

determining, by the token service provider device, that the transactable token is associated with the supplemental transaction data previously received by the token service provider device;

sending, by the token service provider, the at least some of the first portion transaction information and the supplemental transaction data in the same Application Programming Interface (API) call to the payment service provider device;

completing, by the payment service provider device, the second transaction with the card network using only the at least some of the first portion transaction information, presented in the routing message standard; and providing the at least some of the supplemental transaction data to a user device associated with the user along with information associated with a completion of the second transaction with the card network.

10. The method of claim 9, further comprising:

identifying, by the token service provider device and based on de-tokenizing the transactable token, the common ID; and identifying, by the token service provider device, the funding instrument corresponding to the common ID;

selecting, by the payment service provider device, a payment method within the funding instrument to charge for the transaction;

sending, by the payment service provider device, a charge request including a set of parameters to an issuing bank that approves or rejects charges to the payment method, the set of parameters including the payment method, a user's name, and an amount of the transaction; and receiving, by the payment service provider device, a charge response from the issuing bank, the charge response specifying an approval or rejection of the charge to the payment method.

11. The method of claim 9, further comprising:

selecting, by the payment service provider device, a payment method within the funding instrument to charge for the second transaction;

sending, by the payment service provider device, a charge request including a set of parameters to an issuing bank that approves or rejects charges to the payment method, the set of parameters including the payment method, a user's name, and an amount of the second transaction; and receiving, by the payment service provider device, a charge response from the issuing bank, the charge response specifying an approval or rejection of the charge to the payment method.

12. The method of claim 9, wherein if the second payment token corresponds to the common ID, the funding instrument is provided by the payment service provider device to the user.

13. The method of claim 9, wherein the transactable token is a single-use token that is routable back to the token service provider device that issued the token.

14. A non-transitory machine-readable medium having stored thereon machine-readable instructions executable to cause a machine to perform operations comprising:
   receiving, from a token requestor device, a request for a transactable token corresponding to a common ID and supplemental transaction data, wherein the request for the transactable token is in response to a request to pay for a transaction using a user's account with a payment service provider device and the request includes transaction information, wherein a first portion of the transaction information includes information that is acceptable in a routing message field standard of a routing message standard used by a card network routing message, and wherein a second portion of the transaction information includes supplemental transaction data associated with the merchant application and that cannot be provided in a card network routing message that uses the routing message standard due to the supplemental transaction data not being acceptable in the routing message field standard;
   generating the transactable token that is representative of the transaction, that corresponds to the common ID, and that is associated with the supplemental transaction data via a unique ID;
   sending the transactable token to the token requestor device that causes the token requestor device to send a card network routing message that uses the routing message standard and that includes at least some of the first portion of the transaction information and the transactable token to a card network;
   receiving the transactable token from the card network using the routing message standard;
   publishing a notification that includes the supplemental transaction data and the corresponding unique ID and that is provided to the payment service provider device;
   de-tokenizing the transactable token;
   identifying, based on the de-tokenizing, the common ID, the unique ID, and a funding instrument that is provided by the payment service provider device; and
   providing, to a payment service provider device, the at least some of the first portion of the transaction information that includes the funding instrument and the unique ID, wherein the unique ID is used by the payment service provider device to correlate the supplemental transaction data with the at least some of the first portion transaction information received that is associated with the unique ID, wherein the payment service provider device to completes the second transaction with the card network using only the at least some of the transaction information presented in the routing message standard, and provides the at least some of the supplemental transaction data to a user device associated with the user along with information associated with a completion of the second transaction with the card network.

15. The non-transitory machine-readable medium of claim 14, wherein the at least some supplemental transaction data provided by the payment service provider device to the user device is provided in an e-receipt to the user device.

16. The system of claim 1, wherein the supplemental transaction data is used by the payment service provider to conduct a risk assessment of the second transaction before completing the second transaction with the card network.

17. The method of claim 9, wherein the supplemental transaction data is used by the payment service provider device to conduct a risk assessment of the second transaction before completing the second transaction with the card network.

18. The non-transitory machine-readable medium of claim 14, wherein the supplemental transaction data is used by the payment service provider device to conduct a risk assessment of the second transaction before completing the second transaction with the card network.

\* \* \* \* \*